(12) United States Patent
Taylor

(10) Patent No.: US 7,163,179 B1
(45) Date of Patent: Jan. 16, 2007

(54) COMMERCIAL SERVICE PLATFORM IN SPACE

(76) Inventor: Thomas C. Taylor, 3705 Canyon Ridge Arc, Las Cruces, NM (US) 88011

( * ) Notice: Subject to any disclaimer, the term of this patent is extended or adjusted under 35 U.S.C. 154(b) by 246 days.

(21) Appl. No.: 10/987,088

(22) Filed: Nov. 12, 2004

Related U.S. Application Data

(63) Continuation-in-part of application No. 10/366,905, filed on Feb. 14, 2003, now abandoned.

(51) Int. Cl.
*B64G 1/10* (2006.01)
(52) U.S. Cl. .................. 244/159.2; 244/159.4
(58) Field of Classification Search ............ 244/158.9, 244/159.2, 159.4, 159.5, 159.6, 172.4
See application file for complete search history.

(56) References Cited

U.S. PATENT DOCUMENTS

| | | | |
|---|---|---|---|
| 4,715,566 A | 12/1987 | Nobles | |
| 4,865,514 A | 9/1989 | Tsuchihashi et al. | |
| 5,065,640 A | 11/1991 | Koren et al. | |
| 5,145,130 A | 9/1992 | Purves | |
| 5,299,764 A | 4/1994 | Scott | |
| 6,231,010 B1 | 5/2001 | Schneider et al. | |
| 6,299,105 B1 | 10/2001 | Gilmore | |
| 6,439,508 B1 | 8/2002 | Taylor | |
| 6,547,189 B1 | 4/2003 | Raboin et al. | |

*Primary Examiner*—Timothy D. Collins
(74) *Attorney, Agent, or Firm*—Deborah A. Peacock; Peacock Myers, P.C.

(57) ABSTRACT

Affordable commercial service platforms in space focusing on customer affordability, quality microgravity services, innovation and combining five emerging space technologies. The invention provides an integrated approach to microgravity services in orbit. First, the reusable launch vehicle (RLV) offers affordable transportation services, platform reboost, and eliminates platform subsystems of propulsion, RCS, liquid storage/resupply, and the like. Second, deployable structures are not heavy for the launch, but expand in orbit. Third, orbital phone networks offer customers control of unmanned experiments. Fourth, an enhanced robotic system transfers payloads. Fifth, manufactured thin film solar cells in orbit offer advantages including weight/cost reductions. The orbital service platform has a low initial cost, expands as the market demands, is repairable, offers quality unmanned microgravity, leads to production facilities using similar hardware and offers numerous affordable commercial services.

23 Claims, 13 Drawing Sheets

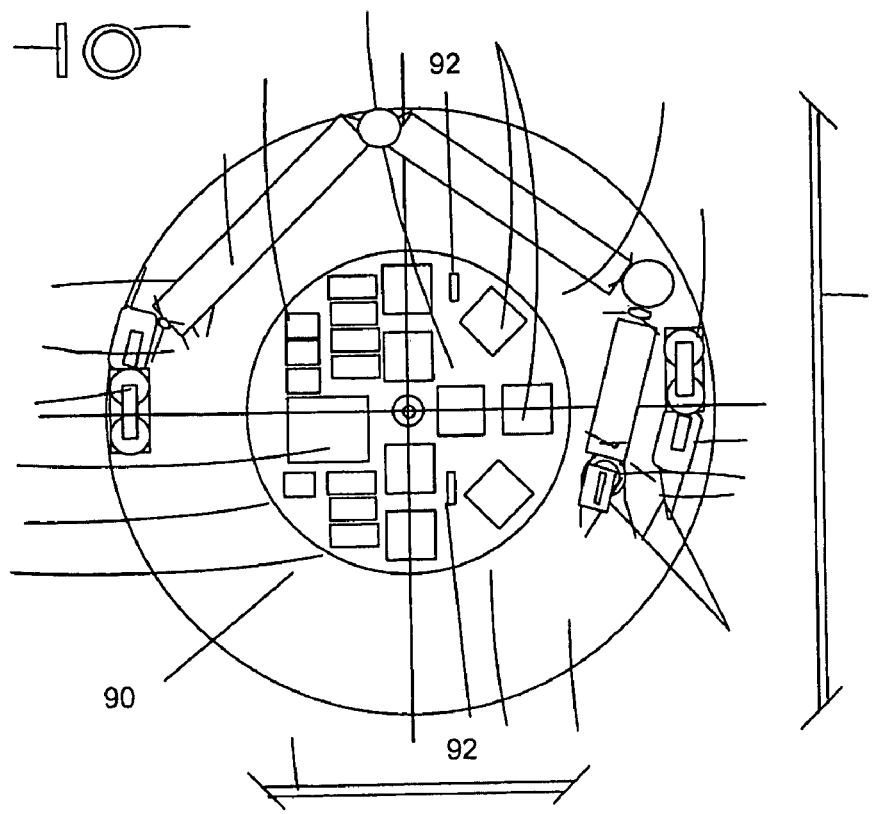

FIG. 2E

Two plates of composite material held apart by short tube section with tube inside robotic track and the ability to transfer boxes, make connections, control the robots and disconnect using telecommunications from ground

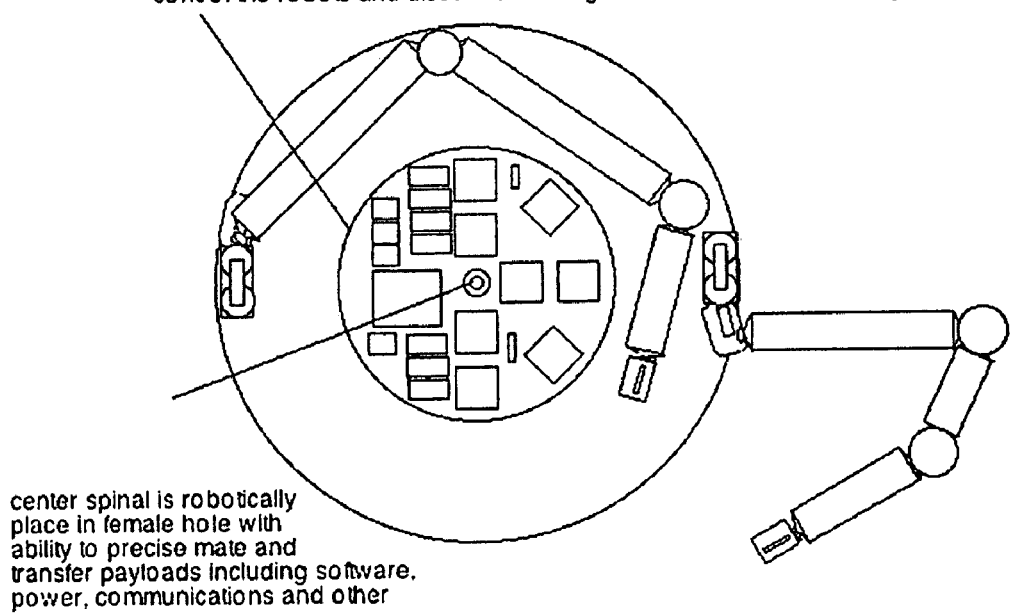

center spinal is robotically place in female hole with ability to precise mate and transfer payloads including software, power, communications and other

FIG. 2F

COMMERCIAL SERVICE PLATFORM IN SPACE

CROSS-REFERENCE TO RELATED APPLICATIONS

This application is a continuation-in-part application of U.S. patent application Ser. No. 10/366,905, entitled "Commercial Service Platform in Space", to Thomas Carl Taylor, filed on Feb. 14, 2003 now abandoned, and the specification thereof is incorporated herein by reference.

NO GOVERNMENT RIGHTS

No government funding, no government support or government contract or clause is related to this invention.

COPYRIGHTED MATERIAL

A portion of the disclosure of this patent document contains material that is subject to copyright protection. The owner has no objection to the facsimile reproduction by anyone of the patent document or the patent disclosure, as it appears in the Patent and Trademark Office patent file or records, but otherwise reserves all copyrights whatsoever.

BACKGROUND OF THE INVENTION

1. Field of the Invention (Technical Field)

The present invention relates to unmanned orbital hardware for the delivery of customer services in space using innovation and the combination of emerging technologies to provide affordable commercial services on the orbital node on the transportation cycle to space.

2. Background Art

The transportation of cargo to space and maintaining a platform in orbit is expensive. Cost is the problem. The cost creates a barrier to commercial development of space and the investment of private capital in technically viable ventures. Governments rely on large aerospace organizations for future studies and these private "for profit" organizations make their money by delivering aerospace hardware to government agencies as it rolls out the door. The aerospace industry uses cost estimating techniques based primarily on weight and previous cost experience, so part of the problem is the "built-in" incentive to deliver larger heavier hardware of increasing cost, so the fees based on a percentage are increased. The current result is an $85 billion International Space Station that the potential commercial customers and most member nations are finding too expensive to maintain an adequate crew and use as a research facility. Current government attempts to address the cost of space transportation, for example, have resulted in over $5 billion in failed government programs dating back to the National Aerospace Plane that have spent money with little progress toward solutions to the problem of cost.

The problem is the cost of the individual operations required to transport cargo to orbit, do business and return some productive result. After over 50 years of aerospace development experience, the orbital commercial environment is still expensive. Transportation is approximately half the cost of commercial space ventures. The European Space Agency (ESA) has taken over half of the world launch market with newer technology and a better-positioned launch site near the earth's equator. Expendable launch vehicles (ELVs) are currently used for most payload transportation to space, but ELVs are revisions to the World War II technology based on disposing of the hardware safely into oceans or unpopulated areas.

U.S. Pat. No. 6,439,508 to Taylor, entitled "INFLATABLE HABITATION VOLUMES IN SPACE," discloses a habitation volume inflatable in space and which can be connected to other volumes in space to provide orbital habitation facilities.

Previous attempts to satisfy commercial users of microgravity, the view from space, high vacuum, large temperature change and the other attributes of space have been expensive. Some believe two orders of magnitude in cost reduction must be found to stimulate the increased commercial use of space. Cost reductions must include the transportation to and from orbit plus the hardware and unmanned services in orbit.

U.S. Pat. No. 4,867,395, to Taylor, et al., entitled "FLAT END CAP MODULE FOR SPACE TRANSPORTATION SYSTEMS," discloses a flat end cap on each end of a truncated manned pressure cylinder module on an expensive transportation vehicle. The '395 patent discloses a pressurized module in the space shuttle payload bay that has reduced the cost of manned tended research in the space by a factor of ten. This was not enough to stimulate significant commercial experiment flow to establish follow-on industries. The device reduces the transportation costs by being shorter and using heavy pressure disc flat end caps, which must withstand a full interior pressure. The present invention flat end cap is similar in name only and is not a manned module at any time. The SPACEHAB system replaced a nearly identical European supplied Module system ($920 million) called "Spacelab" with a commercial start-up venture with $105 million in a private funds, an innovative hardware solution and the same "Spacelab" structure subcontractor. It did reduce the cost of "Mid-Deck Locker" research in microgravity and the hardware used by an order of magnitude. A reduction of two more orders of magnitude in cost reduction is required.

U.S. Pat. No. 5,431,328 to M. E. Dobbs, et al., entitled "SPACECRAFT PAYLOAD EXCHANGE SYSTEM" discloses a passive docking system dependent on a forward velocity and collision to complete the docking and transfer of canisters to accomplish microgravity manufacturing. Individual canisters are transferred, after their stay in orbit, back to a carrier vehicle for return to earth. The transfer of mass across a separation plane is far more complicated and expensive than it needs to be. The transfer of power, communication and structural connection is transferred, which appears to sell hardware rather than eliminate it and its cost.

U.S. Pat. No. 3,910,533 to D. C. Cheatham, et al., entitled "SPACECRAFT DOCKING AND ALIGNMENT SYSTEM," discloses a space docking system that requires duplicate targets and monitor means on both vehicles. The system again requires some impact velocity to force the mechanical systems to work and again sells hardware. This invention is expensive, manned and uses an impact docking system. It does not have active aspect or rotation.

U.S. Pat. No. 5,816,539 to Chan; entitled "INTEGRATED STORAGE AND TRANSFER SYSTEM AND METHOD FOR SPACECRAFT PROPULSION SYSTEMS," discloses an orbital assist module (OAM) built into the stack of an expendable launch vehicle (ELV). The orbital assist module propellant comprises liquids such as hydrazine and it is difficult to handle liquid rather than eliminate liquid in all forms.

U.S. Pat. No. 4,730,797, to Minovitch, et. al., entitled "INFLATABLE CORE ORBITAL CONSTRUCTION METHOD AND SPACE STATION," discloses a construction form inflated in orbit and used to hold wraps of other materials to form large space volumes. The '797 patent device is complicated and expensive. Although suggested as automatic, much of what is suggested is hand labor. Labor in orbit is 1,000 to 1 times more expensive than on the surface for the portions of this device that cannot be automatic and must be performed in a microgravity vacuum. Without gravity, typical construction techniques in one gravity do not work in microgravity and vacuum. There is no mention of solutions for the above or launch loads and pressure used for habitation in orbit, plus any high-speed particle impact protection in orbit. The '797 patent device is manned and the inflatable envelope is useful only as a form in orbit. The '797 patent device offers only a large up-front cost, transportation on an expensive vehicle and no phased build up to soften the financial impact of the project or allow the revenue flow to be used in later financial support of the project.

U.S. Pat. No. 4,562,979, to Taylor, et. al., entitled "EXPANDABLE SPACECRAFT" discloses a telescoping metal module innovation in an attempt to double the interior volume using a shorter module and less metal. The '979 patent to Taylor in Jan. 7, 1986 also discloses difficult-to-use seals in the extended configuration. The extra metal required to react to the launch loads encountered and provide a maximum pressurized volume in a 3 gravity launch load vehicle adds significant weight. The '979 patent is an attempt to start a habitation volume in orbit, but uses metal and it is heavy. The manned metal module pressure boundary in the Spacelab Module is limited to fifty days on orbit by design and has limited impact protection. The removal of the module from the space shuttle is complicated in orbit, not a part of '979 patent device and the Spacelab Module requires the Environmental Control Life Support (ECLS) Systems from the orbiter. The solution is expensive partly, because it is designed to be manned. Spacelab modules have been given to museums and replaced by less expensive SPACHAB and other more expensive International Space Station hardware.

U.S. Pat. No. 5,184,789, to Aldrin, entitled "SPACE STATION FACILITY," discloses a standard space station with metal pressurized modules and lots of struts. Manned activities are generally thought to be an order of magnitude more expensive and more complicated than the unmanned present invention. The '789 patent pressurized modules are standard metal and the struts fold in the center to fit within the 60' long space shuttle. This means the struts are approximately 120' long and the modules larger than any known launch vehicle could carry. It is not clear what value the struts provide; e.g., do they make the modules lighter and how do they address the primary commercial issues of transportation weight and cost? One gravity thinking common to the earth's surface and typical of humans evolved in a one gravity environment is easy to transfer to low or microgravity of space in the form of scaffolding, but this type of thinking seems to have limited value in space. The absence of gravity actually requires less structural strength than the earth's surface one gravity environment. Space or microgravity design just requires keeping the modules spaced from each other in a manner so as not to damage the commercial quality microgravity. The quality microgravity is a function of the distance of a specific location from the center of gravity of a series of modules in orbit. In orbit certain gravity gradient forces exist within long structures in microgravity space and these small forces degrade the pure quality of the microgravity by adding extra gravity gradient force, which induce forces in a commercial quality microgravity that are not wanted. The '789 patent device is manned, maximizes the logistics required with struts and uses rigid strut structures to hold distant or space the microgravity modules with some provisions for the forces during reboost. Rigidity is counterproductive in a 3-gravity launch environment. The launch design loads are generally three times the loads experienced in a one gravity earth environment and usually drive the design rather than the loads experienced in orbit. Building bigger, more centralized facilities is expensive and distributed de-centralized facilities are the norm in surface based commercial operations.

U.S. Pat. No. 4,834,325, M. A. Faget, et al., entitled "MODULAR SPACECRAFT SYSTEM," discloses a modular metal module dependent on the space shuttle and traditional solar arrays that require expensive pointing hardware. This manned structure was estimated to cost $3 billion in the mid 1980's, but was thought by NASA to potentially compete with ISS and failed to get built. While the '325 patent device had metal to resist the launch loads in the launch configuration, it was one or two orders of magnitude more expensive than required. Max Faget's $3 billion manned concept would have eliminated the present space station and the next NASA step, which means it had little chance politically and the initial cost was difficult to raise from private sources, partly because it was not phased to take advantage of the customer revenue flow. The system was pressurized, manned and had rotating solar arrays pointing toward the sun.

U.S. Pat. No. 5,511,748, to Scott, entitled "METHOD OF EXTENDING THE USEFUL LIFE OF A SPACE SATELLITE," continues the dream of satellite servicing for most of traditional aerospace and NASA, but it fails to address the major stumbling block with the satellite manufacturers. The major stumbling block is no satellite manufacturer or financier will build a space serviceable satellite, until a satellite servicing industry exists.

U.S. Pat. No. 5,451,975, to Miller, et al., entitled "FURLABLE SOLID SURFACE REFLECTOR," discloses a metal expanding structure with interlocking metal panels expanded to create a reflector. While this solution may address launch loads in the compressed configuration and provide a reduced volume; little else applies to the useful life of an inflatable or executable service platform.

U.S. Pat. No. 3,836,417, to Yaeger, et al., entitled "LAMINATE FOR HUMAN HABITATION," discloses earth based air supportable structures with rigidized beams on the surface of the earth, but in a microgravity/vacuum environment the pressure alone provides the beam strength until the membrane suffers a puncture. The composite materials in the '417 patent device do not appear appropriate for microgravity, vacuum and impact uses. The composite layers contain metal flakes, which may result in significant weight. Again unmanned is the next step rather than the manned solutions, which failed to get any private or government funding as TransHab.

U.S. Pat. No. 4,024,679, assigned to Irvin Industries, Inc., to Rain, et. al., entitled "AIR SUPPORTED STRUCTURE MEMBRANE CONFIGURATION," discloses surface based air supported volumes with multiple layers and structural beams rigidized by air on the surface of the earth. In orbit in a microgravity environment, the inflation pressure is sufficient for strength. These composite materials do not appear appropriate for microgravity, vacuum and impact uses; however the material does have limited radiation protection. Reasonable inflatable designs exist for the orbital environment, but this is probably not one of them.

U.S. Pat. No. 5,813,632, to Taylor, et al., entitled "SALVAGE HARDWARE APPARATUS AND METHOD FOR ORBITING OBJECTS," discloses salvaging hardware transported to orbit for other reasons and potentially available in orbit. The '632 patent device salvages the external tank using a subsystem package transferred from the space shuttle by the remote manipulator system (RMS).

The '632 patent device uses a space shuttle transported systems package to accomplish salvage of the discarded tank hardware in orbit and proceeds to use the pressurized tank volume for new uses including a habitation configuration. No extra metal is required and no transportation costs are incurred, except for the salvage systems package, and the material and labor used to develop the interior of the ET in orbit. This solution is in the range of $150 m to $300 m per salvaged item and could offer two orders of magnitude of cost reduction for manned volumes in orbit, but the concept is too large of a change from normal practice to permit private financing and too economical to attract government contractor or government interest. TransHab was a NASA attempt to change the government/industry mindset, for example, and not successful. The unmanned platform is a big enough leap.

The transportation loads encountered by the tank are not changed on ascent and later the tank is reused to provide a maximum of pressurized manned volume in orbit, (The external tank of the space shuttle is, for example, pre-tested to +40 psia before launch.) with added interior and Environmental Control Life Support Systems (ECLSS) placed inside the tank in orbit. The '632 patent device is an attempt to develop the habitation volume in orbit from existing materials, but the ET is metal, labor intensive and it is heavy. The on orbit labor rate is currently 10,000+ times higher than on earth.

U.S. Pat. No. 5,350,138 to Cubbertson, et al., entitled "LOW COST SHUTTLE-DERIVED SPACE STATION," discloses a combination of an external tank and the space shuttle using pre-positioned inflatable inserts instead of inserts placed in orbit as suggested in the present invention. Altering the external tank before launch in any way requires a re-certification of the external tank, which is very expensive.

In contrast, the present invention uses a reusable launch vehicle with special capabilities and a simple replicable platform in orbit with only the platform subsystem capabilities required. This platform hardware is gravity gradient stabilized, which requires no propellant, is self powered by solar cells without any pointing capability, simple robotics capable of transferring customer cargo to and from the platform and self communicating using the emerging low earth orbit phone networks. The present invention includes an unmanned use of the salvaged external tank device and uses a non space shuttle transported subsystem package.

SUMMARY OF THE INVENTION

The present invention relates to an apparatus or platform in outer space. The preferred platform comprises a module with at least two end caps. The module is transportable to outer space in a compressed form and inflatable in outer space between the end caps. At least one of the end caps comprises at least one robotic device for inflating the module in space.

The platform may connect with another space vehicle. Preferably, the platform connects with a module of the other space vehicle, then the other module is movable to the platform. One end cap preferably rotates and meshes with an end cap on the other space vehicle module via the robotic device.

The platform preferably comprises extendable and retractable connection hardware. This connection hardware is adjustable and rotatable to one or more positions. The end caps are preferably flat. The flat end caps preferably comprise a disc shape.

The platform preferably comprises a robotic device track. The robotic device is preferably capable of switching out, stowing and loading modules. The robotic device is preferably stowed in the end cap for transport into outer space in a deflated position and inflated in outer space. The robotic device preferably comprises an end effector and at least one elbow. All of the end caps comprise robotic devices. Likewise, at least one end cap preferably comprises communications electronics and/or transportation electronics.

The end caps are disposed apart by an inflatable or deployable structure. They are preferably disposed far enough apart to establish a gravity gradient stability for the platform.

The invention may further comprise a support structure between the end caps for supporting the inflated platform. This support structure may comprise a truss system.

The invention is also directed to an orbital unmanned platform combined with a reusable launch vehicle comprising: a payload transported to space in a payload bay of the reusable launch vehicle; and a different payload transported upon return from space in the payload bay of the reusable launch vehicle. This combination creates a complete transportation cycle and a functioning node in space. Part of the payload may remain in space and at least part of the payload may return from space. The payloads may be accumulated, assembled, tested and transferred to other transportation vehicles at the node platform. The present invention also relates to a method of transporting a module in a space vehicle to outer space comprising the steps of: stowing a module in a compressed form between at least two end caps, the end caps comprising at least one robotic device; transporting the module in the compressed form into outer space; and inflating the module between the two end caps via the robotic device in outer space. The present invention may further comprise the step of exchanging the module with another space vehicle module in outer space via the robotic device. The present invention may further comprise the step of adding an additional module from another space vehicle in outer space via the robotic device. The robotic device is capable of switching out modules, stowing modules, and loading modules.

In accordance with the commercial service platform in space method of the invention of delivering services in low earth in a cost effective manner, the hardware of the invention uses the combination of capabilities of a reusable launch vehicle in support, a simple platform system with common integrated ground handling, upgrading and payload processing.

The present invention also relates to a space platform having a first module which is transportable to outer space in a compressed form and inflatable in outer space. The first module preferably has end caps disposed at its ends. At least one of the end caps can have one or more tracks circumferentially disposed within or around it. The first module preferably expands along an axis defined by the end caps during inflation. Further, one or more carriers are preferably disposed on the one or more tracks. The first module also preferably has one or more inflatable robotic arm devices disposed within each of the end caps, and the arm devices are can be attached to one of the carriers.

The space platform of the present invention can also include a second module transportable to outer space in a compressed form and inflatable in outer space. This second module preferably has end caps disposed at its terminal portions. At least one of these end caps can have one or more tracks circumferentially disposed within or around it. Like the first module, the Second module also preferably expands along an axis defined by the end caps during inflation. The second module also can have one or more carriers disposed on the one or more tracks, and one or more inflatable robotic arm devices disposed within each of the end caps and attached to one of the carriers. Each of the carriers of the first and second modules are preferably movable about its corresponding track.

The first and second modules are preferably connectable at the end caps. One of the end caps on the first module preferably rotates with an end cap on the second module from force provided by one or more of the robotic arm devices. The end caps are preferably capable of transferring connectable box items between the end caps.

The space platform of the present invention can also have extendable and retractable connection hardware, and the connection hardware can be adjustable and rotatable connection hardware.

At least some of the robotic arm devices are preferably capable of switching out, stowing and loading additional modules. Each of the end caps can comprise a disc-shape, and the space platform can also have communications electronics, as well as transportation electronics. The robotic arm devices of the present invention can have at least one elbow, and/or an end effector. The first module is preferably expandable to a length sufficient to establish gravity gradient stability for the platform of the present invention. Further, a support structure can be disposed between the end caps of the first module, and this support structure can comprise a truss system.

The present invention also relates to an orbital unmanned platform combined with a reusable launch vehicle comprising an unmanned payload transported to space, the payload having an inflatable structure with end caps disposed at terminal portions thereof. The structure preferably expands along an axis defined by the end caps during inflation. At least one of the end caps can have one or more tracks circumferentially disposed within or around the end cap, and one or more carriers can be disposed on the one or more tracks. The orbital unmanned platform combined with a reusable launch vehicle also preferably includes one or more inflatable arm sections disposed within the end caps and attached to one of the carriers. Further, a different payload can be transported upon return from space, thus creating a complete transportation cycle and a functioning node in space.

At least part of the payload can remain in space and at least part of the payload can return from space. The payloads can be accumulated, assembled, tested and transferred at a node platform.

Accordingly, several objects and advantages of the present invention are the cost effectiveness, reliability, efficiency, and an orbital service platform with minimum platform subsystems required. The platform permits re-configuration to specific customer systems and increased customer sensitivity.

Another primary object of the commercial service platform in space is to transport the customer's cargo to and from the platform in orbit, plug the cargo into the commercial service platform in space location, derive the services available in a cost effective manner and later return the cargo to the customer.

A primary advantage of the present invention is the cost effective combination of a reusable launch vehicle subsystem, orbital hardware including efficient affordable structures, power and communications subsystems, pre-engineered common computer interfaces, payload and shipping envelopes, communications, power, command and control tasks and attitude control subsystems.

The advantage of the commercial service platform on a reusable launch vehicle is an opportunity for the elimination of platform subsystems by using subsystems already on the launch vehicle including reboost and/or platform hardware providing cost effective common subsystems through commonality in design, procurement, testing and payload loading.

Another advantage of the invention is the common ground handling techniques, technical maintenance, financing and ownership of the platform, launch vehicle, and payloads.

Another advantage of the invention is an integrated commercial payload delivery operation that all works together in a cohesive manner to accomplish the ground processing, launch, transfer to the proper orbit, plug-in of the payload, services in orbit, potential follow-on support, and safe return of some of the delivery payload hardware.

Another advantage of the commercial service platform is an integrated design, flexible flow process to be capable of accommodating, on a general customer base, a number of different payloads from numerous organizations with varying requirements, different weights, various final orbits, different ground processing requirements, and varying financial needs.

Another advantage of the commercial service platform is an integrated design, combined with the reusable launch vehicle capable of the future coupling of the platform and the reusable launch vehicle for the changing of orbital altitude, location and gravity gradient orientation for purposes of accommodating orbital decay of the platform, decreasing the normal systems required on either object, enhancing either object with items from the other object and disposing of the platform at end of life.

Another advantage of the invention is the increased energy efficiency in the use of solar cells, including the different sources and technologies, the decreased cost in simplifying the ground handling by using the same payload envelopes as transported in the reusable launch vehicle, increased flexibility from the simple orbital platform, and the increased reliability and simplified handling from the common pre-tested hardware systems.

Another advantage of the invention is a single, affordable, robotic interface located at the base of the orbital service platform and each payload.

Another advantage of the orbital service platform is an inflatable or deployable payload structure that holds the customer payloads from the K-1 orbital vehicle (OV) or other vehicles using robotic systems.

Another advantage of the invention includes the various payloads with different shapes that can be attached to the support structure using adaptable structural interfaces.

Manufacturing advances in the thin film solar cell manufacturing and the resulting solar arrays offer a substrate and array that is ¼ the cost and 1/10 the weight of previous space solar arrays. These more affordable arrays may be flexible, space resistant and refurbished in orbit.

Another advantage of the invention is the lack of a propulsion system or propulsion subsystems.

Another advantage of the invention is the lack of propellant tanks pressurized by gas storage bottles filled with pressurants.

Another advantage of the invention is the lack of an orbital service platform avionics system.

Another advantage of the invention is the lack of an orbital service platform reboost system.

Another advantage of the invention is the lack of an orbital service platform attitude control system.

Another advantage of the invention is the lack of an orbital service platform manned support system.

Another advantage of the orbital service platform, in a nominal mission mated with one or more customer payloads, is the reboost using the K-1 and/or other vehicle to perform the platform reboost and repositioning.

Another advantage of the invention is the robotics capability to capture and deploy the orbital service platform and delivery vehicle to sufficient distance to allow for further separation by the vehicle's thrusters.

The orbital service platform places payloads into a location where the attributes of space are accessed by the customer's payloads, because the platform combines the advantages of a reusable launch vehicle with the flexibility, common subsystems, multiple payload placement and various service systems of the Orbital Service Platform.

Other objects, advantages and novel features, and further scope of applicability will be set forth in part in the detailed description to follow, orbital service platform drawings taken in conjunction with the accompanying drawings, and in part will become apparent to those skilled in the art upon examination of the following, or may be learned by practice of the invention.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings:

FIGS. 2D–2F are drawings showing cutaway views of end caps of the present invention wherein inflatable arms are disposed;

DESCRIPTION OF THE PREFERRED EMBODIMENTS

BEST MODES FOR CARRYING OUT THE INVENTION

Figure 1:
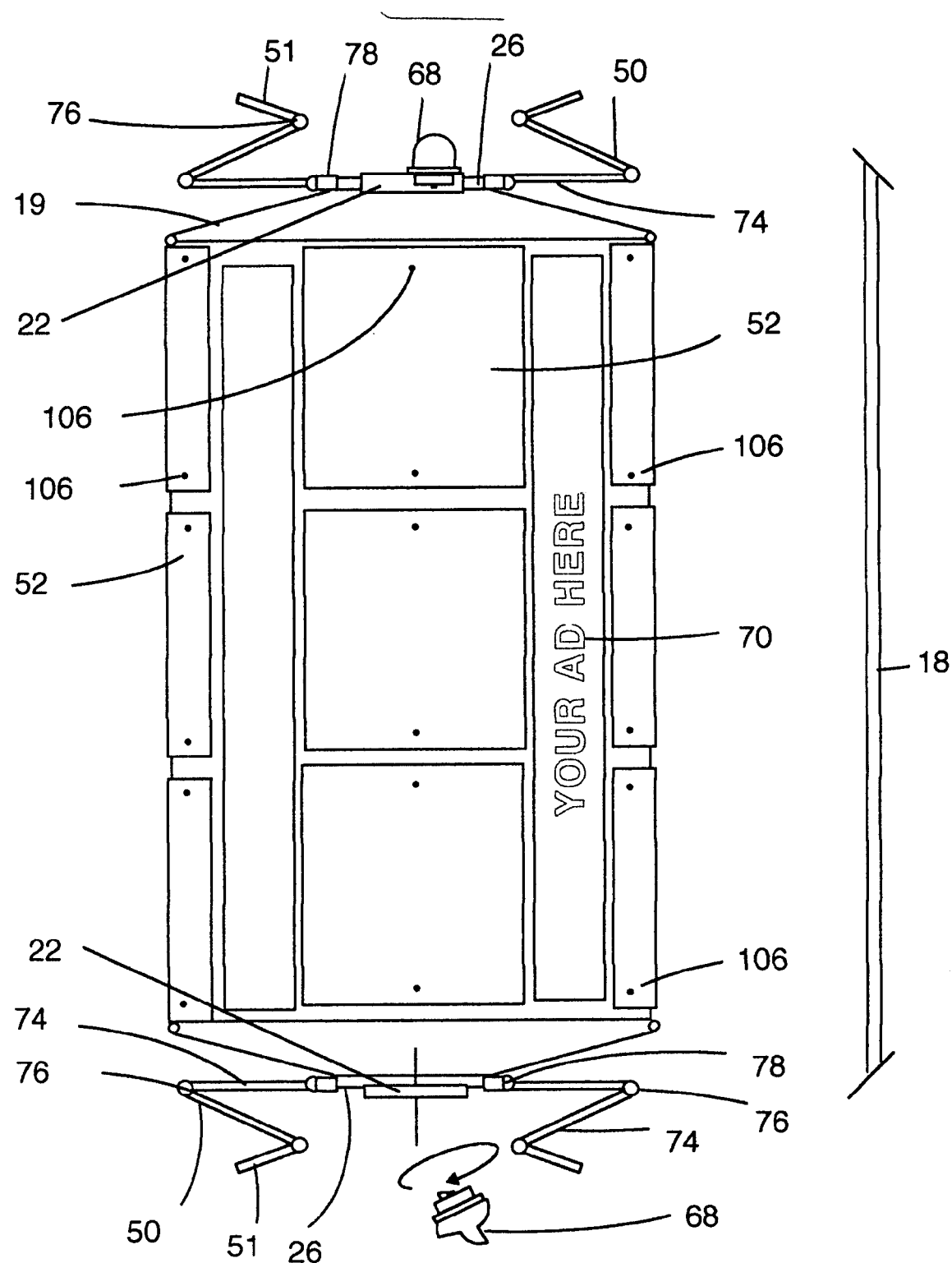
FIG. 1 is an orbital service platform of the present invention.

The commercial service platform in space of the present invention offers an affordable solution to the access to the attributes of space by combining five new technologies with innovation.

Reusable Launch Vehicles (RLVs) offer some additional affordability in the transportation to orbit. These RLVs offer initial transportation, deployment services, check out of orbital hardware, reboost and platform upgrades/degrades plus later disposal. An emerging space transportation trend is a reusable launch vehicle used to deploy payloads in a predetermined orbit. These vehicles have evolved over the last few years and are capable of multiple hardware reuse at a cost-effective commercial rate. These evolutionary RLVs are further enhanced by innovation to provide affordable space platforms. Recent reusable vehicle advances, technological improvements and commercial market forces have moved the payload industry toward smaller, more commercial networks of communications payloads requiring multiple payloads in various orbital planes around earth. The system of the present invention, i.e., reusable launch vehicle, communications network, inflatable/deployable structures, advanced robotics, solar arrays and unmanned evolution, are applied to space platforms.

The increased demand for communication payload networks has given rise to active, more capable customer sensitive payload phone networks offering the customer the ability to operate its orbital hardware from a decentralized computer via a phone link. The new commercial networks require new innovative payloads of different size, weight and transportation requirements. Existing government space facilities have always been thought to require large centralized facilities, but the trend can go the other way in the commercial world.

Inflatable and deployable structures both offer options for affordable structures in orbit by being compressed during launch and expanding in orbit to deploy the two flat end cap disks. Inflatable structures offer the options of expanding in orbit, forcing the two flat end cap structures apart with a temporary inflatable envelope, rigidizing the created volume with inflation gas and foam, deploying solar arrays and remaining useful with internal structural foam. Deployable truss structures also offer the options of expanding in orbit, forcing the flat end cap structures apart, deploying solar arrays and contracting as required for solar array reel replacement, reboost and other purposes The platform uses inflatable and deployable structures for solar cell support, platform structure and expandable robotic arms.

Stowable robotic technology offers more unmanned robotics options in orbit by applying unmanned aero vehicle (UAV), expandable robotic arms, enhanced TV viewing and control, end effector change-out tooling and communication technologies to orbital robotic operation.

Manufacturing advances in the thin film solar cell manufacturing and the resulting solar arrays offer a substrate and array that is $\frac{1}{4}^{th}$ the cost and $\frac{1}{10}^{th}$ the weight of previous space solar arrays. These more affordable arrays are flexible, space resistant and potentially refurbished in orbit.

The commercial service platform in space of the present invention places payloads into a location where the attributes of space are accessed by the customer's payloads, because the platform combines the advantages of a reusable launch vehicle with the flexibility, common communications, structures, robotics, power and subsystems, multiple payload placement and various service systems of the orbital service platform.

The commercial service platform in space of the present invention relates to enhancing existing reusable launch vehicle (RLV) technology and its use in the payload transportation industry. The present invention provides a more cost-effective transportation cycle capable of placing cargo into orbits beyond the capability of original RLV or expendable launch vehicle (ELV).

Reference is now made to FIG. 1, which illustrates a preferred embodiment of the invention. FIG. 1 is an early orbital service platform using inflatable platform 18 and reusable launch vehicles to produce an affordable alternative to existing sources for microgravity researchers. Flat end caps 26 on each end of rigidized platform envelope structure 19 containing payload module interface 22 where one flat end cap 26 on inflatable platform 18 meshes and rotates with second flat end cap 26 on future payload module 23 (shown in FIG. 5) to produce an interface plane where various attributes are transferred either physically and/or electronically from one flat end cap 26 to another flat end cap 26.

Using robotic arm 50 with end effector 51 to grapple or grab flat end cap 26 of payload module 23 (shown in FIG. 5) and attach modules or other devices to the vicinity of another flat end cap 26, where payload module interface 22 uses center spindle or male device to mate with and join with female side of another payload module interface 22 to pull the disks together and align with rotation each disk with the other disk. Robotic arm 50 has elbow 76, inflated or rigidized arms 74, and end effector 51, which rotates 360 degrees using circular disk with track 78 on flat end cap 26. The orbital service platform also has solar panel 52 to provide power, re-entry capsule 68 for customer return of hardware and commercial advertising 70 for the generation of revenue. Solar cell panel connection with robot arm 106 is positioned on each solar panel 52 to permit the changeout, as required, of solar panel 52 with end effector 51 on robotic arm 50.

Figure 2A:
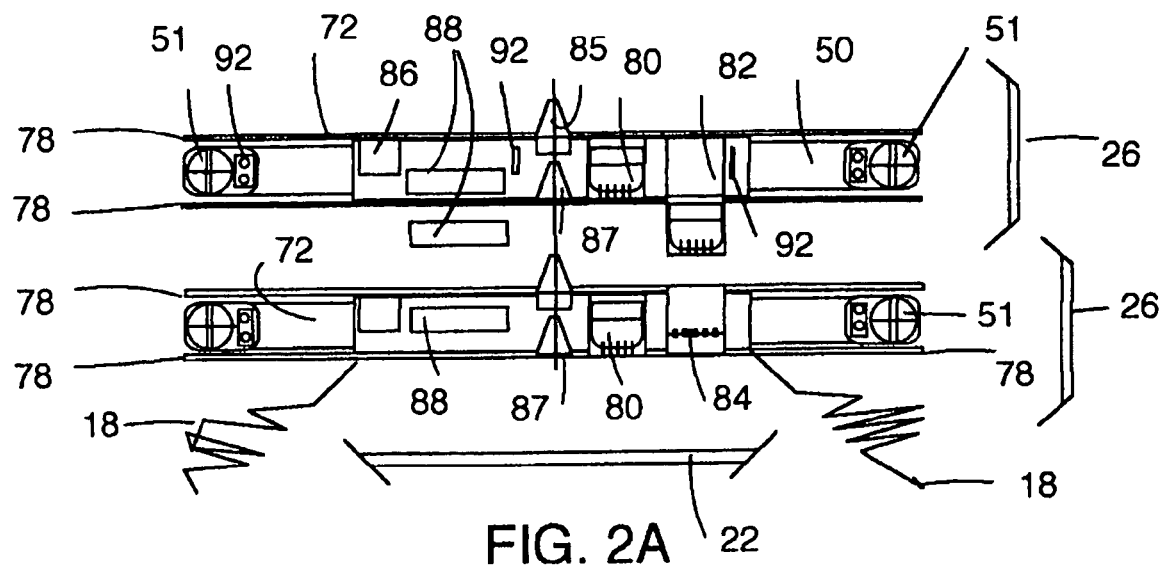
FIGS. 2A–2C are drawings showing side views of end caps of the present invention having inflatable arms disposed therein.
Figure 2B:
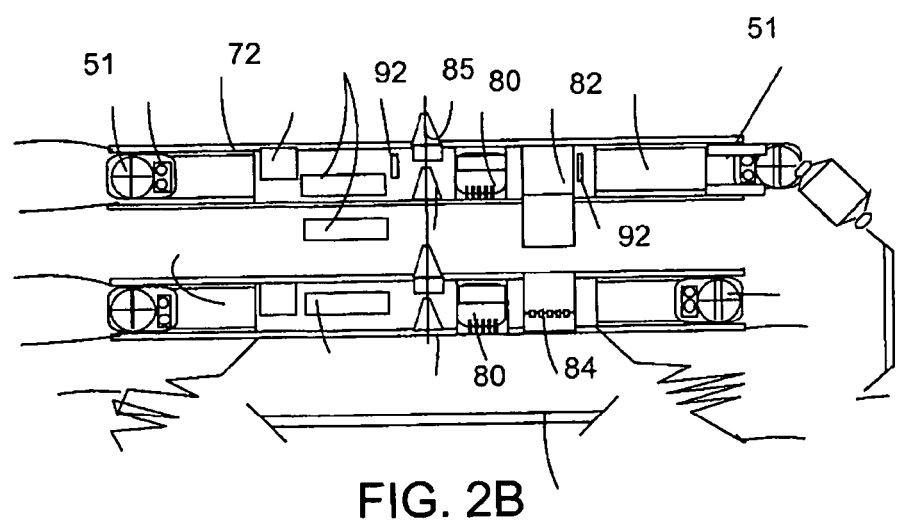
Figure 2C:
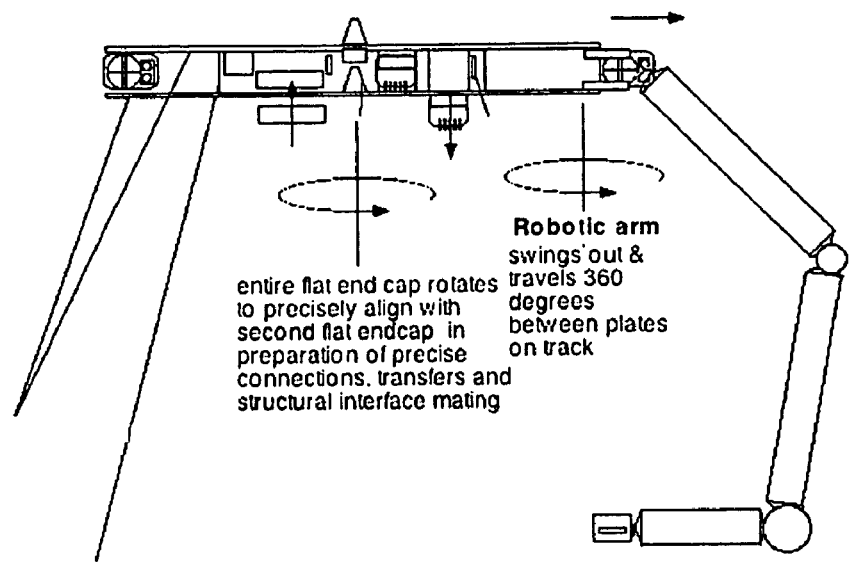
Figure 2D:
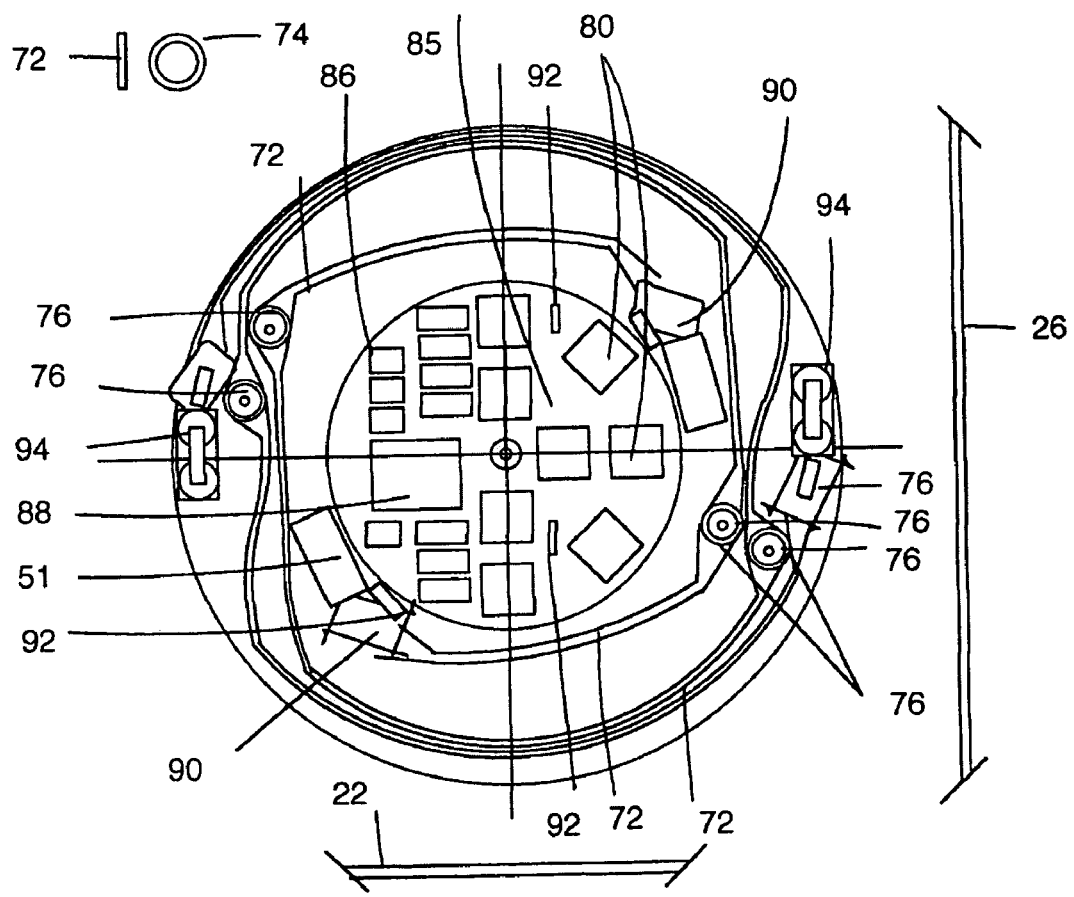

FIGS. 2A–2C (side views), and FIGS. 2D–2F (section views), show flat end cap 26, which is preferably disposed at each end of inflatable platform 18. Payload module interface 22 is preferably created by the joining of two flat end caps 26 as depicted in FIGS. 2A and 2B. Robotic arm 50 of a first end cap preferably uses end effector 51 to attach to a second flat end cap 26 and pull it near the first end cap for the purpose of drawing the first and second end caps together at payload module interface 22. Payload module interface 22 is considered the entire area within the full thickness of material connecting a first flat end cap 26 with a second flat end cap 26, except the volume used to stow the robotic arm 50 and components of the robotic arm system. Robotic arm 50 preferably has elbow 76. Robotic arm 50 is preferably transported into space as deflated arm 72, which is subsequently inflated and becomes rigidized arm 74, with end effector 51, which preferably rotates 360 degrees on flat end cap 26. Rigidized arm 74 preferably uses track-mounted robotic traveler 94 on circular disk with track 78 to rotate 360 degrees around flat end cap 26 and grapple items with the aid of TV camera 92. Robotic arm 50 has end effector change out device 90, which is preferably stowed within flat end cap 26, to permit the change-out of end effector tools to fit specific tasks. While a myriad of end effector designs can be used by robotic arm 50 of the present invention, an end effector is preferably provided which enables to arm 26 to easily grasp and manipulate flat end cap 26. Although robotic arm 50 can be controlled from space, it is preferable that telecommunication systems known to those skilled in the art be used to enable earth-based control of arm 50.

A first flat end cap 26 is placed by robotic arm 50 near second flat end cap 26 so as to put male center spindle connection 85 near enough to female center spindle connection 87 with both controlled by the surface to further join or mate the first and second flat end caps 26 with the help of TV camera 92. First end cap 26 and second Flat end cap 26 are preferably joined at the center and rotated around the center with respect to each other and adjusted with respect to the distance between the two. Inside, TV camera 92 is preferably used to view the precise adjustments from the ground of stowed connection interface 80, battery container 88 and other items to permit alignment, connections and dis-connections of various items. Flat end cap 26 is preferably used to stow and transport various parts for the orbital service platform in both the open volume between the two disks outside of payload module interface 22 and the volume inside payload module interface 22. Minor adjustments in alignment and distance are accomplished by viewing TV camera 92 and communication from the surface to various telerobotic devices on stowed connection interface 80, battery container 88 and other devices. Inflatable platform 18 is preferably stowed for launch in a compact cylindrical shape with one flat end cap 26 on each end. Inside flat end cap 26 is platform subsystem package 86 and battery container 88, which are transferred from one flat end cap 26 to another flat end cap 26 when joined by payload module interface 22. Stowed connection interface 80 becomes extended connection interface 82 with remote command from the surface after the two flat end caps 26 are mated. Extended connection interface 82 is aligned, guided and mated to connection receptacle 84 providing a flow of attributes including power, communications, and other utilities from one platform subsystem package 86 to another similar platform subsystem package 86.

Flat end cap 26 also has the ability to leave platform subsystem package 86, battery container 88 and other boxes in the mated and plugged in condition for purposes of testing the new combination of old and new box and leaving the combination in orbit for purposes of upgrading the platform. Battery container 88 and other boxes are sized to accept second battery container 88 or other boxes and operate together to enhance the platform, because of redundancy and backup subsystems.

While exterior portions of flat end cap 26 can be made from a number of materials known to those skilled in the art, composite materials are preferably used, and these exterior portions are preferably spaced apart with a short tube structure. With the ability of arm 50 to manipulate and mate flat end caps 26, modules can be joined without the need for an impact velocity.

Figures 3A, 3B, 3C:
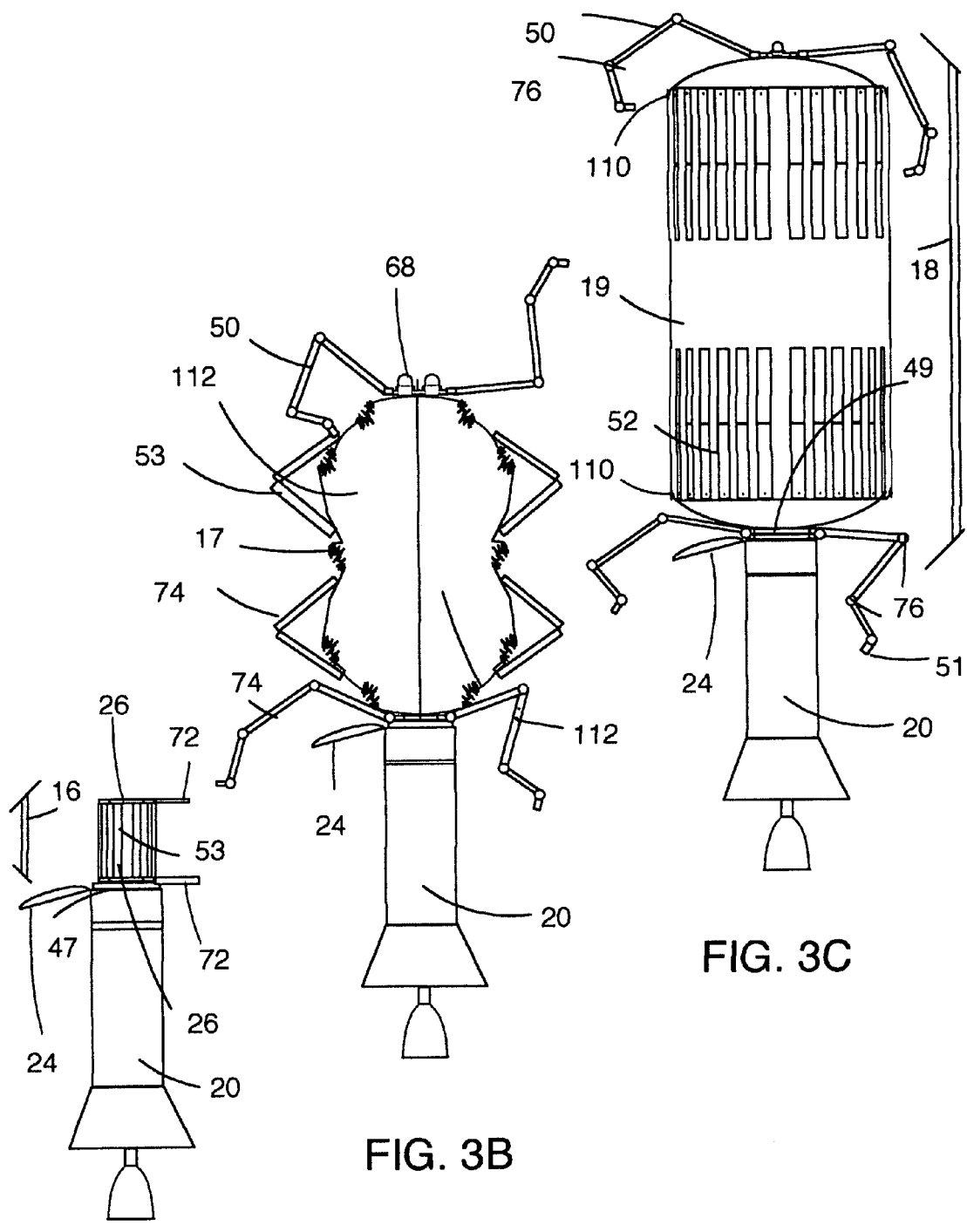
FIGS. 3A–C show the deployment system of the present invention.
Figure 5:
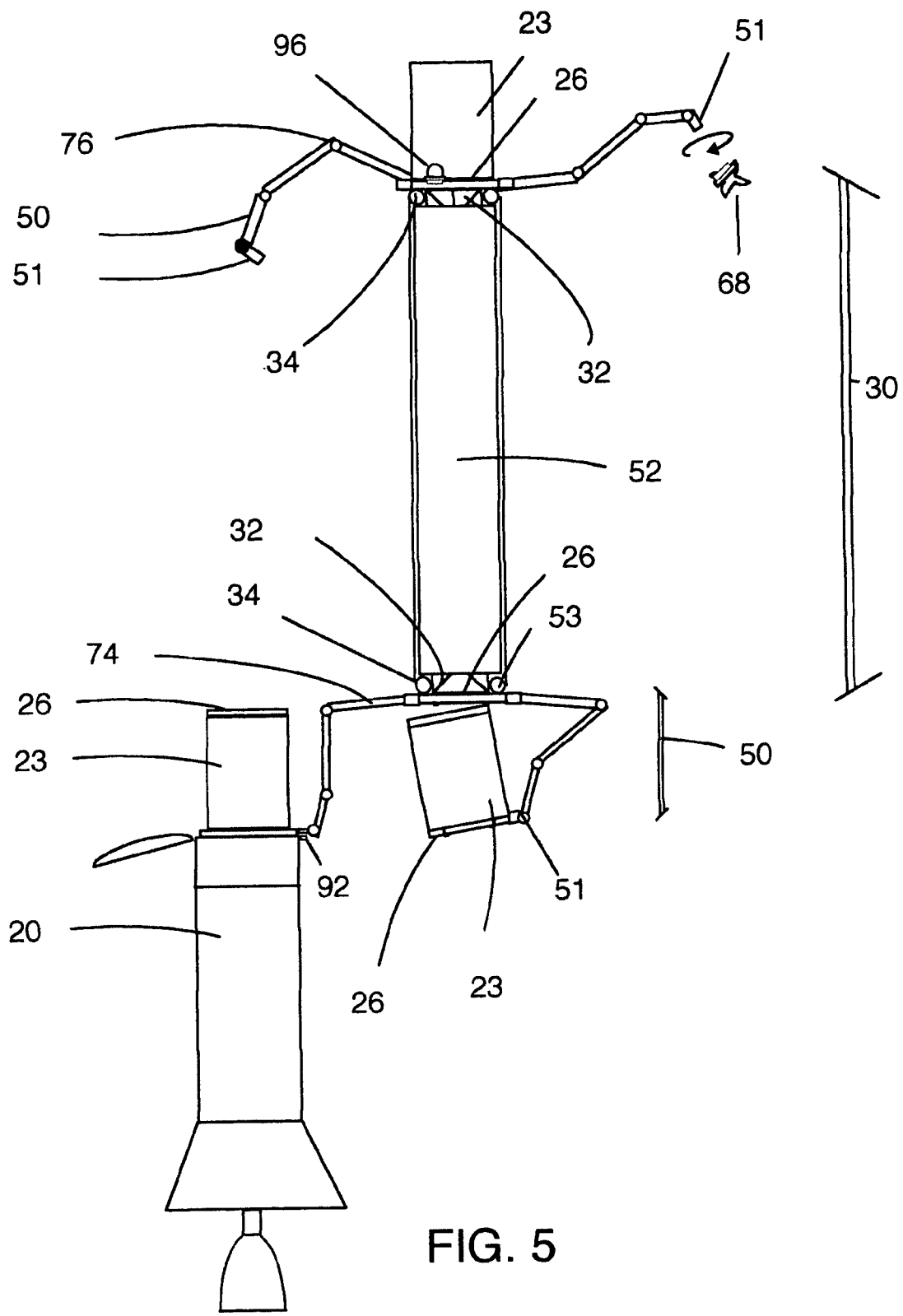
FIG. 5 shows the expanded truss orbital service platform of the present invention transferring customer payloads to and from a reusable launch vehicle (RLV)

FIGS. 3A–C show the deployment system of the present invention, which uses a reusable launch vehicle space such as the K-1 orbital vehicle (OV) 20, inflatable technology such as stowed inflatable platform 16 and low earth orbit communications such as communications bus from one or more of the low earth orbit networks, but is also unique for what it does not use. Rigidized inflatable platform envelope structure 19 is long enough to use the gravity gradient stabilization rather than attitude control systems requiring propellant, thruster systems and other platform subsystems. A Stowed inflatable platform 16 enclosed within two flat end caps 26 and a series of stowed solar panels 53 is simple enough to launch on a single launch with some revenue producing services intact. Inflating platform 17 remains attached to the reusable launch vehicle as the inflation and deployment progresses, so as to insure a successful working orbital service platform conclusion prior to separation using payload module K-1 attachment remotely operated 49. A similar deployment process is depicted in FIG. 5 for deployable platform 30 with deployable truss structure 32 and stowed solar panel 53 in solar panel reel 34 that becomes deployed solar panel 52.

Step one of the deployment of stowed inflatable platform 16 is transport in K-1 orbital vehicle (OV) 20 and payload module dome 24 is opened. K-1 orbital vehicle (OV) 20 uses extended payload module 47 to carry two flat end caps 26 with rigidized platform envelope structure 19 in between with stowed solar panel 53 used as the outer packing container with a cable cutter pyrotechnic device as the deployment sequence starter at each end. Robotic arm 50 is stowed as deflated arm 72 and is stiffened into rigidized arm 74 in two ways. First, the pressuring gas unfurls and rigidizes the tube structure. Second, the pressuring gas also activates foaming powder 112 inside the tube and converting it to rigidized arm 74.

Step two of the deployment of stowed inflatable platform 16 is the stabilization at the proper orbital altitude and orbital inclination with long axis toward the center of the earth and payload module dome 24 open. Stowed solar panel 53 is used as the outer packing container with a cable cutter pyrotechnic device as the deployment sequence starter at each end. Redundant inflation systems packed on the interior of the extended payload module 47 activate the deployment and inflation of stowed inflatable platform 16. Robotic arm 50 is stiffened and used to spread apart inflating platform 17 panels and membranes. First, the pressuring gas unfurls and rigidizes stowed inflatable platform 16, which becomes inflating platform 17. Second, the pressuring gas also activates foaming powder 112 cavities of inside inflating platform 17 and converting it to rigidized platform envelope structure 19. Foaming powder 112 starts a slow process that inflates, expands and become rigid in layers, tubes and other volumes with inflation gas activation to permit the inflated volumes to be penetrated by high speed orbital objects without deflating these rigid volumes. Inflating platform 17 also changes stowed solar panel 53 into solar panel 52 by unfolding and doubling their stowed length with the help of robotic arm 50. Re-entry module 68 contains customer payloads, gets power, communications and structural attachment from the inflatable platform 18 and is controlled from the surface via built in low earth orbit communications network bus acting as one of the series of network satellites.

Step three continues the inflation process with the help of four robotic arms 50 with elbows 76 and end effectors 51. Inflating platform 17 is stiffened into inflatable platform 18 in two ways. First, the pressuring gas expands and provides activated foaming powder 112 filled interior layer inside the inflatable layer to rigidized platform envelope structure 19. Second, the pressuring gas also activates torus ring inflatable volume 110 at each end of the inflated cylinder inside the tube and converting the structure to inflatable platform 18. The orbital service platform is checked out with the launch vehicle in place including the power system, communications systems and robotic systems. K-1 orbital vehicle (OV) 20 detaches and with the help of robotic arm 50 drifts away after the completion of detach of payload module K-1 attachment remotely operated 49 and K-1 orbital vehicle (OV) 20 returns to the surface as part of normal operations after securing payload module dome 24.

Figure 4A:
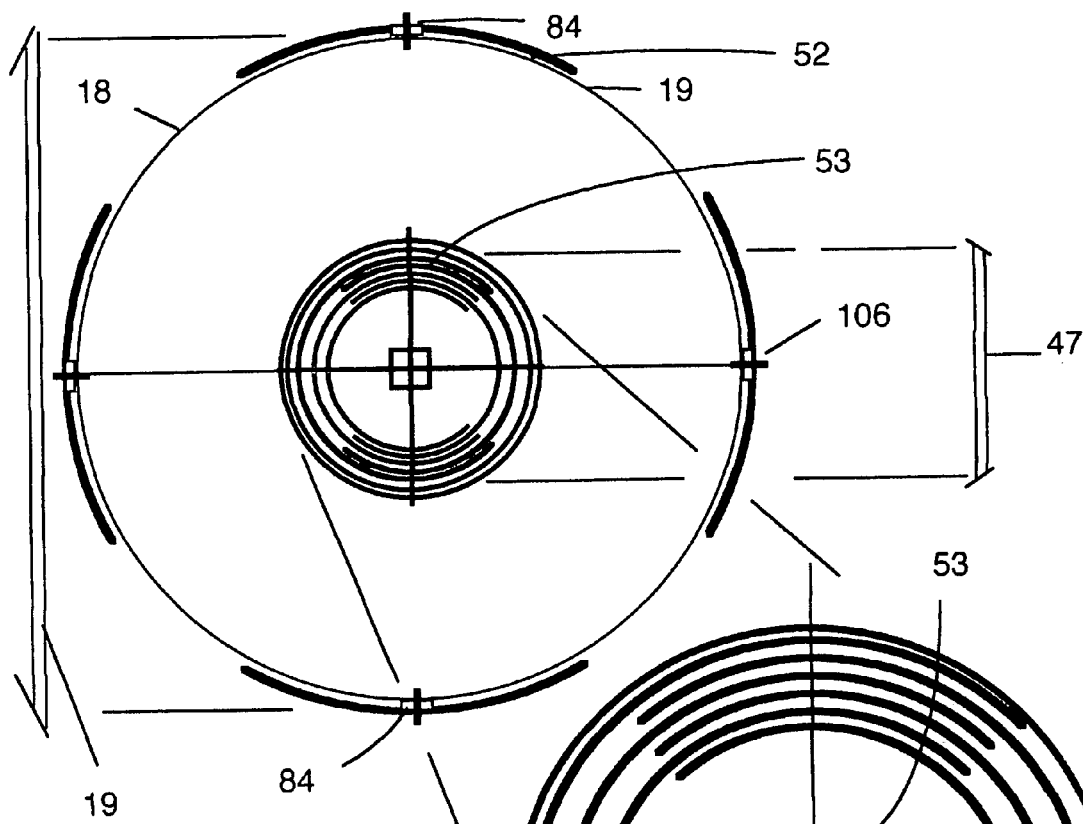
FIGS. 4A–C show the orbital service platform power system of the present invention.
Figure 4B:
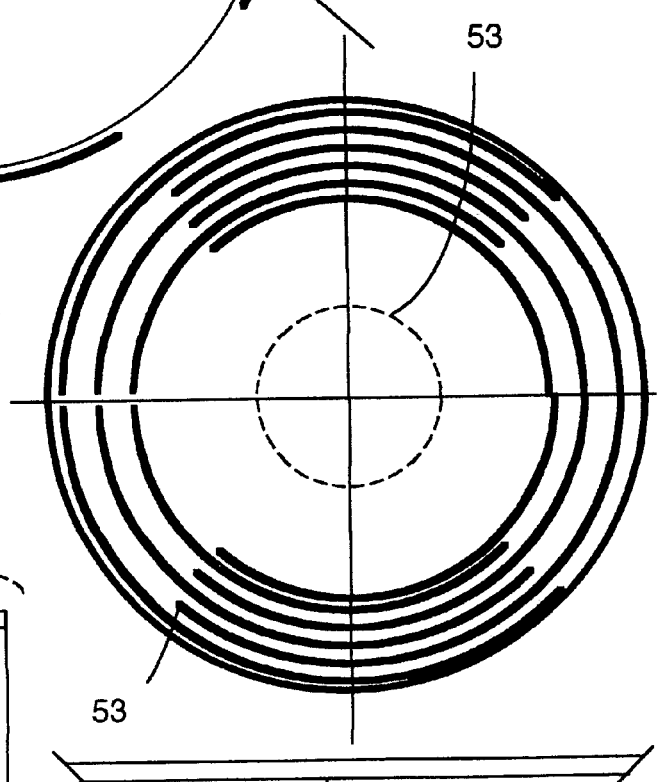
Figure 4C:
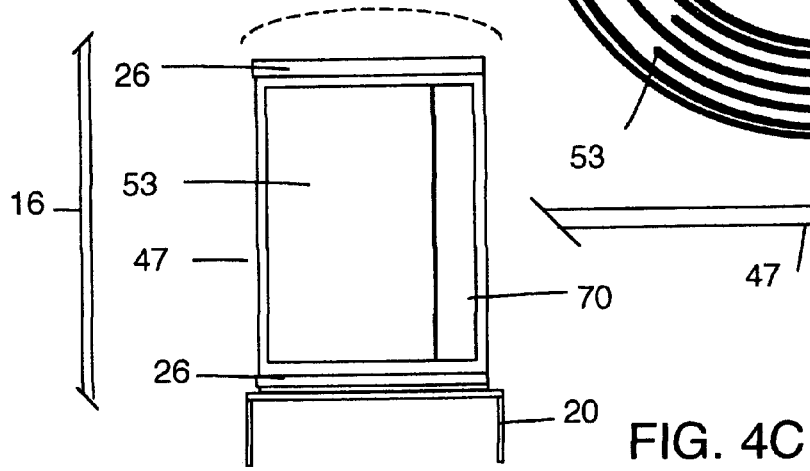

FIGS. 4A–C show the orbital service platform power system and the second of several different alternative methods of stowed solar panel 53. Panels depicted are thin wide curved substrate for manufactured thin film light weight solar cells on stowed solar panel 53 with the panels relatively thin and attached loosely to inflatable surfaces volume with solar cell panel connection with robot arm 106. The second, stowed solar panel 53 shown here in FIG. 4C as stowed inflatable platform 16, is a more rigid stowed solar panel 53. It is molded with a curvature consistent with the stowed diameter and length of extended payload module 47 or similar module and the final use diameter in orbit of inflatable in FIG. 4A platform 18 (also see FIGS. 1 and 3). Stowed solar panel 53 becomes solar panel 52 with different deployed curvature in rigidized platform envelope structure 19 in orbit.

With one flat end cap 26 at each end, stowed solar panels 53 integrated with stowed inflatable platform 16 in extended payload module 47 as shown in FIG. 4C. Solar panels 52 are stowed in a circular manner and already attached to stowed inflatable platform 16 and rigidized platform envelope structure 19 via connection receptacle 84. The solar panels 52 act as a part of the transportation envelope packing exterior of stowed inflatable platform 16. K-1 orbital vehicle (OV) 20 transports stowed inflatable platform 16 also contains commercial advertising 70 in extended payload module 47.

FIG. 5 shows the orbital service platform transferring customer payloads to and from expendable launch vehicles (ELVs), reusable launch vehicle (RLV) or K-1 orbital vehicle (OV) 20. Deployable platform 30 is operated with re-entry capsules 68, until such time that flat end cap 26 payload module 23 is transported to deployable truss structure 32 for transfer to deployable platform 30 by robotic arm 50 using end effector and grapple. Robotic arm 50 is used to assist K-1 orbital vehicle (OV) 20 during station keeping maneuvers and later exchanges of cargo by the second robotic arm 50. K-1 orbital vehicle (OV) 20 is launched with flat end cap payload module 23 and positions itself near the orbital service platform. Rigidized arm 74 with elbows 76 of robotic arm 50 grabs K-1 orbital vehicle (OV) 20 and removes new module and replaces it with similar payload module 23 using second robotic arm 50. Stowed solar panel 53 in solar panel reel 34 becomes solar panel 52 pulled into use on four sides when deployable truss separates the two flat end caps 26 using controls from the surface. End effector 51 is performs solar cell panel connection with robot arm 106 to the deployable truss 32. End effector 51 is capable of assisting small re-entry payload from the small re-entry payload envelope 96 toward re-entry in the atmosphere and is capable of moving payload module 23 with flat end cap 26 capable of accepting end effector 51 to a position payload module 23 with deployed platform 30.

Figure 6:
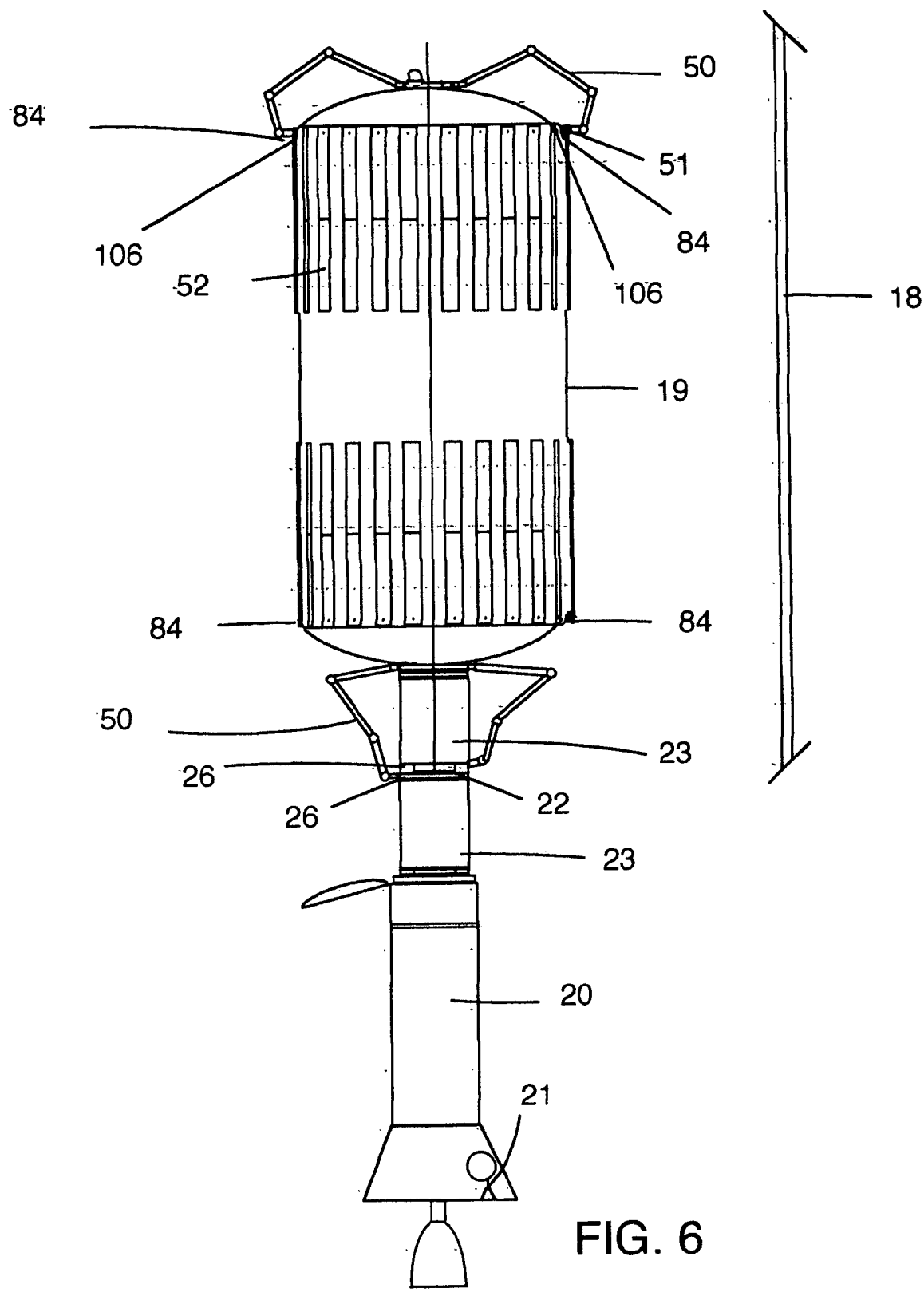
FIG. 6 shows the orbital service platform reboost propulsion system of the present invention.

FIG. 6 shows the orbital service platform reboost propulsion system. Inflatable platform 18 is reboosted using logistics delivery K-1 orbital vehicle (OV) 20. Similar reboost is possible with other versions of the platform. Several methods are used to do the module change out, but one method can use payload module interface 22 to attach the one module on K-1 orbital vehicle (OV) 20 to the module on the platform. This means K-1 orbital vehicle (OV) 20 with two payload modules 23 in line is connected at the flat end caps 26 via payload interface 22 with the rest of inflatable platform 18. Reaction control system K-1 orbital maneuvering system propulsion 21 is used to propel rigidized platform envelope structure 19 to some different location in orbit. Robotic arm 50 is positioned in solar cell panel connection 84 with robot arm end effector 51 of solar panel 52 using end effector 51 to stabilize the platform during reboost. The solar cell panel connection with robotic arm 106 fastens the solar panel 52 to rigidized platform envelope structure 19 and solar cell panel connection 84 allows robot arm 50 with end effector 51 to release solar panel 52 from rigidized platform envelope structure 19 so it can be replaced. The design rigidity of inflatable platform 18 may be driven by the reboost operation, which could collapse the platform, if the propulsion system imparts too much acceleration in the reboost of the module.

Figure 7A:
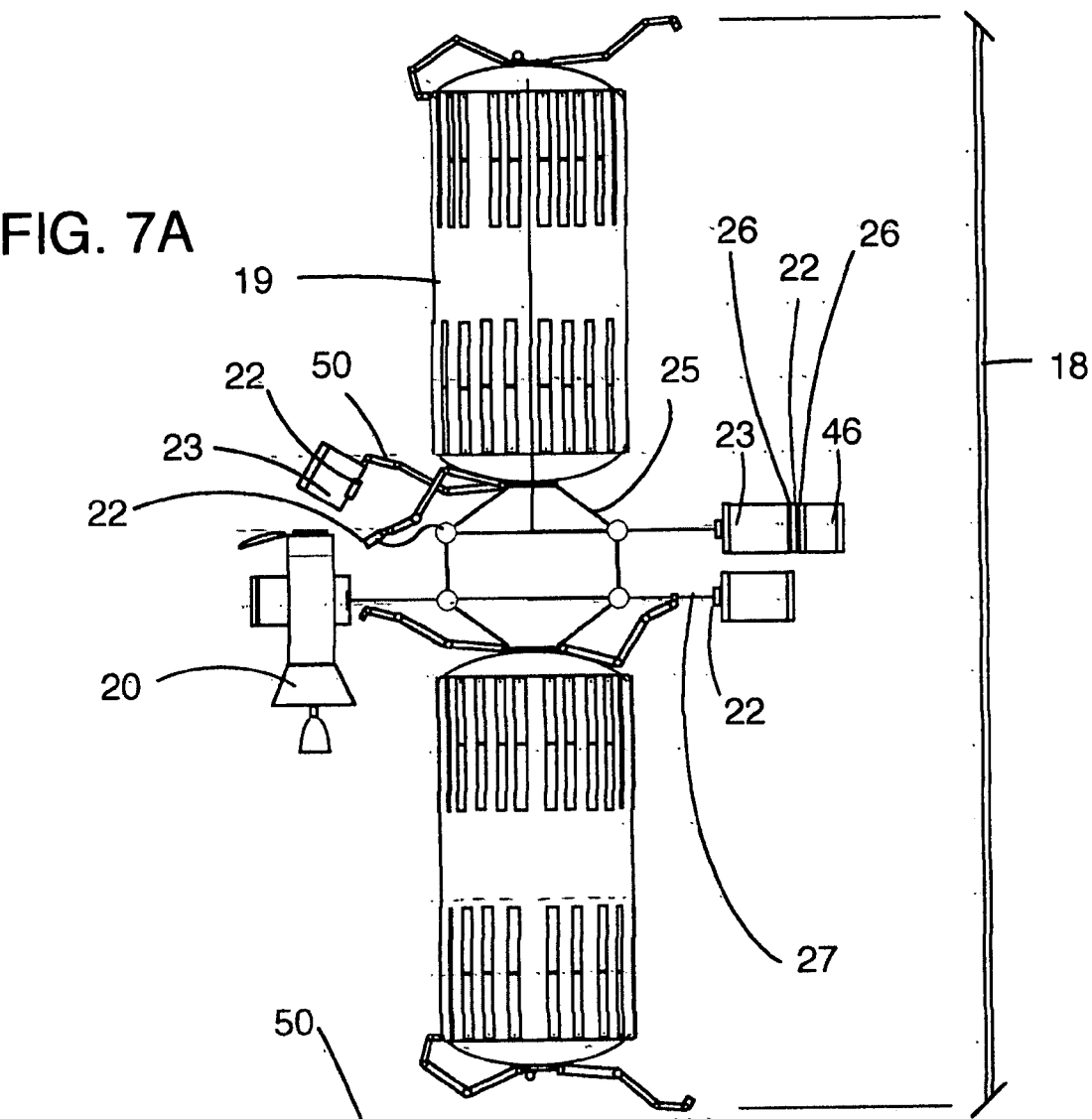
FIGS. 7A and 7B show the double configuration for the orbital service platform of the present invention.
Figure 7B:
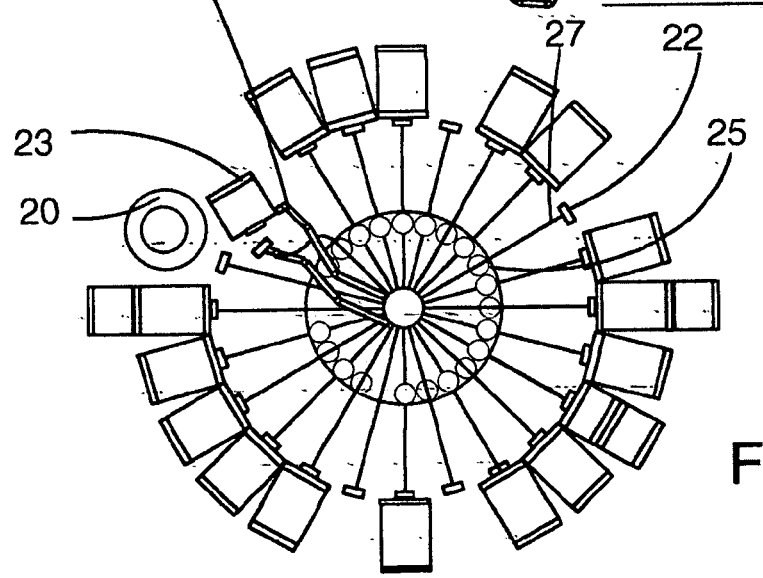

FIGS. 7 A side view and 7B section view shows the double configuration for the orbital service platform and growth version of inflatable platform 18 using several rigidized platform envelope structures 19. Module support structure 25 between two platform envelope structures 19 is a space truss deployment created within payload module 23. Each flat end cap 26 has payload module interface 22 with some capability to specifically modify each payload module interface 22. Self deploying module support structure 25 is a space structure with built in payload module interface 22 and flexible connection cables 27 permitting K-1 orbital vehicle (OV) 20 to plug into payload module interface 22. This expands the number of payload modules 23 supported and power available. K-1 orbital vehicle (OV) 20 reboosts inflatable platform 18 in the same manner Once inflatable platform 18 is upgraded with module support structure 25, second inflatable platform 18 increases the ability of the platform to accommodate more customers is added. Module support structure 25 accommodates up to 48 each payload modules 23 on payload module interfaces 22 at the end of flexible connection cables 27. With the platform balanced each of 48 modules is close to the center of gravity of the platform and the best quality of microgravity is available on the platform. Robotic arm 50 is used to grab payload module interface 22 at one end of flexible connection cables 27 and second robotic arm 50 grabs payload module 23 to perform the transfer. A future production configuration mates payload module 23 containing the heavy production facilities with product module 46 to segment the product manufacturing hardware from the raw materials and finished product carrier in product module 46, which travels back and forth to the surface. This quantity of payload modules 23 may require additional inflatable platforms 18 to accommodate the power requirements. Payload modules 23 remain in the same quality microgravity location, if additional inflatable platforms 18 are added evenly to each end.

Figure 8A:
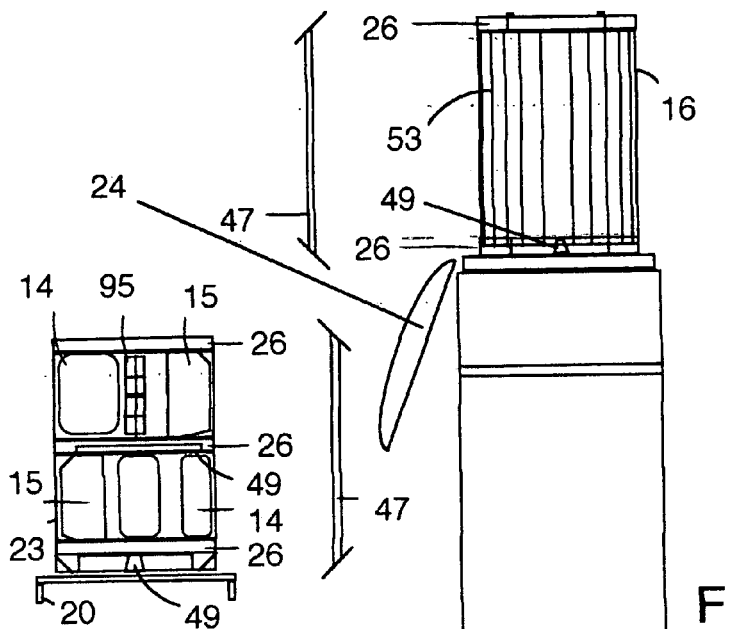
FIGS. 8A–I show an expanded payload carrier configuration of the orbital service platform of the present invention.

FIG. 8A side view shows a side view of extended payload module 47 configurations for K-1 orbital vehicle (OV) 20 of the orbital service platform. Extended payload module 47 is fabricated from three flat end caps 26 in between cylinders capable of being separated into two payloads for return to the earth's surface as one unpressurized module with payload module K-1 attachment remotely operated 49. The second return payload module 23 can be pressurized and either can contain sounding rocket diameter payload envelope 14, space station rack payload envelope 15 and small brick payload envelope 95.

Figure 8B:
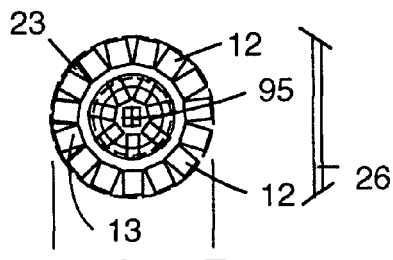

FIG. 8B section view shows a section view of an extended payload module (not visible in section view) configurations for K-1 orbital vehicle (OV) of the orbital service platform. The payload module is fabricated from two flat end caps 26 in a cylinder with payload module K-1 attachment remotely operated on one end. Payload module 23 contains mid-deck locker payload envelopes 12 and expanded locker payload envelope 13 in ring shapes patterns in both the side and upright position with last minute slip in small brick payload envelopes 95 in the center.

Figure 8C:
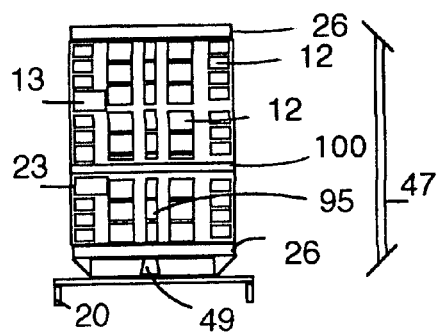

FIG. 8C shows a side view of extended payload module 47 configurations for K-1 orbital vehicle (OV) 20 of the orbital service platform. Payload module 23 is fabricated from two flat end caps 26 in a cylinder with payload module K-1 attachment remotely operated 49 on one end. Payload module 23 contains mid-deck locker payload envelopes 12 in ring shapes patterns in both the side and upright position with last minute slip in small brick payload envelopes 95 in the center. Expanded locker payload envelope 13 is larger than mid-deck locker payload envelope 12 due to the curved nature extended payload module 47. Separation plane remotely operated 100 is used to divide those payloads returning to earth and those payloads consumed, discarded in orbit or in re-entry operations.

Figure 8F:
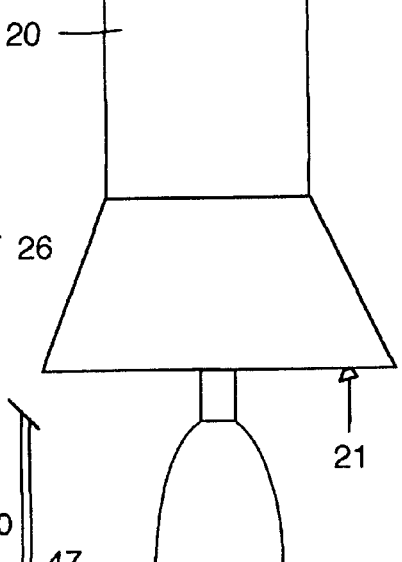
Figure 8D:
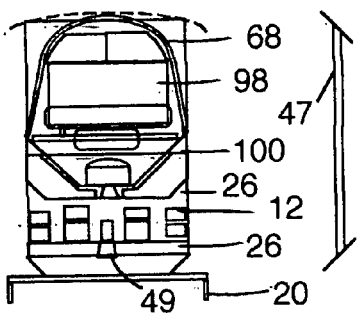

FIG. 8D shows a side view of extended payload module 47 configuration for K-1 orbital vehicle (OV) 20 of the orbital service platform. Expanded payload carrier configuration for large re-entry payload envelope 98 is sized to fit within the maximum payload envelope available within K-1 orbital vehicle (OV) 20 of the orbital service platform. The normal utilization for large re-entry payload envelope 98 without the platform is to launch the re-entry capsule 68 with sufficient power, communications and other support hardware to remain in orbit for a specific period of time and return to the surface by re-entry methods discarding the support hardware. The normal utilization for large re-entry payload envelope 98 with the platform is to launch the re-entry capsule 68, plug into the platform and use platform power, communications and other support hardware to remain in orbit for a specific period of time and eject for return to the surface using de-orbit propulsion re-entry methods without discarding the support hardware. Sufficient volume exists for within extended payload module 47 configurations to launch two flat end cap 26 with a cylinder section carrying mid-deck locker payload envelopes 12 and payload module K-1 attachment remotely operated 49. Some interface hardware may be discarded above the top flat end cap 26 and two flat end caps 26 that returned to earth. This modular logistics system uses flat end cap 26 to act as a pressure bulkhead on one side and load carrying for unpressurized re-entry module 68 large re-entry payload envelope 98 on the other side. The re-entry mass capable of being re-entered by K-1 orbital vehicle OV is accommodated by adjusting the mass above and below a separation plane remotely operated 100 within the extended payload module 47 and some mass is ejected as large re-entry payload envelope 98 and some support mass is re-entered by other means.

Figure 8E:
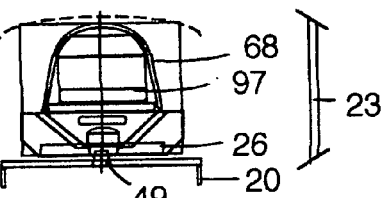

FIG. 8E is a side view of smaller payload module 23 configurations for K-1 orbital vehicle (OV) 20 servicing the orbital service platform. The smaller payload carrier configuration for medium re-entry payload envelope 97 is sized to fit a specific and/or existing customer re-entry payload hardware within K-1 orbital vehicle (OV) 20. The normal utilization for medium re-entry payload envelope 97 with the platform is to plug into the platform re-entry capsule 68 in the form medium re-entry payload envelope 97 and draw sufficient power, communications from the platform. The entire package is to remain in orbit on the platform for a specific period of time and eject or a portion is returned to the surface by re-entry methods. The support hardware base or payload module K-1 attachment remotely operated 49 is recovered and returned to the surface by reattaching flat end cap 26 with support hardware into K-1 orbital vehicle 20 or discarding the support hardware later from the platform. This modular logistics carrier uses flat end cap 26 to act as payload module interface (not shown) to platform and interface and attach to K-1 orbital vehicle (OV) 20 for the launch and transfer.

FIG. 8F shows a side view of an inflated platform 18 compressed inside extended payload module 47 configuration for K-1 orbital vehicle (OV) 20 of the orbital service platform. The length of K-1 orbital vehicle (OV) 20 allows a gravity gradient stable platform with the long axis of the vehicle pointing toward the center of the earth. The K-1 orbital maneuvering system 21 is used to attain the proper orbit for the deployment and used to reboost the platform as required. Expanded payload carrier configuration launches the initial orbital platform consisting of two flat end caps 26, one with payload module K-1 attachment remotely operated 49 in each flat end cap 26 and stowed solar panels 53 with stowed inflatable platform 16 inside and not visible. Payload module K-1 attachment remotely operated 49 requires more innovation, is a part of the flat end cap 26 and is assumed to be both male and female coupling capabilities. K-1 orbital vehicle (OV) 20 is unique partly because it is a blunt nose vehicle capable of removing payload module dome 24 and elevating the payload to a position for unobstructed deployment.

Figure 8G:
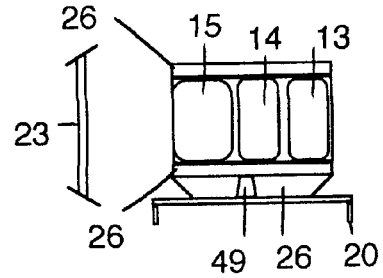

FIG. 8G shows a side view of smaller payload module 23 configurations for K-1 orbital vehicle (OV) 20 of the orbital service platform. Payload module 23 is fabricated from two flat end caps 26 with a cylinder capable of containing various sized payloads including unpressurized or pressurized module volumes such as sounding rocket diameter payload envelopes 14, expanded locker payload envelope 13, space station rack payload envelopes 15 and payload module K-1 attachment remotely operated 49.

Figure 8H:
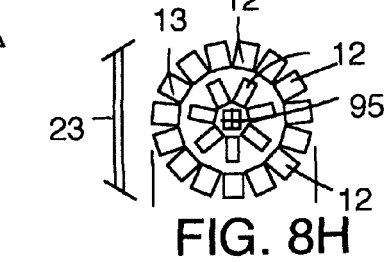

FIG. 8H shows a section view of smaller payload module 23 configurations for K-1 orbital vehicle (OV) 20 (not shown in this Fig.) of the orbital service platform. Payload module 23 is fabricated from two flat end caps 26 (not shown in this Fig.) with a cylinder capable of containing various sized payloads including pressurized module volumes such as mid-deck locker payload envelopes 12, brick shaped experiment envelope 95 and expanded locker payload envelopes 13 with payload module K-1 attachment remotely operated 49 (not shown in this Fig.)

Figure 8I:
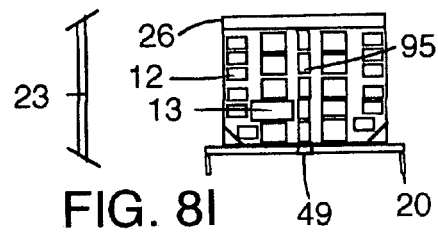

FIG. 8I shows a side view of smaller payload module 23 configurations for K-1 orbital vehicle (OV) 20 of the orbital service platform. Payload module 23 is fabricated from two flat end caps 26 in a cylinder with payload module K-1 attachment remotely operated 49 on one end. Payload module 23 contains mid-deck locker payload envelopes 12 in ring shapes patterns in both the side and upright position with last minute slip in small brick payload envelopes 95 in the center and expanded locker payload envelopes 13.

Figure 9:
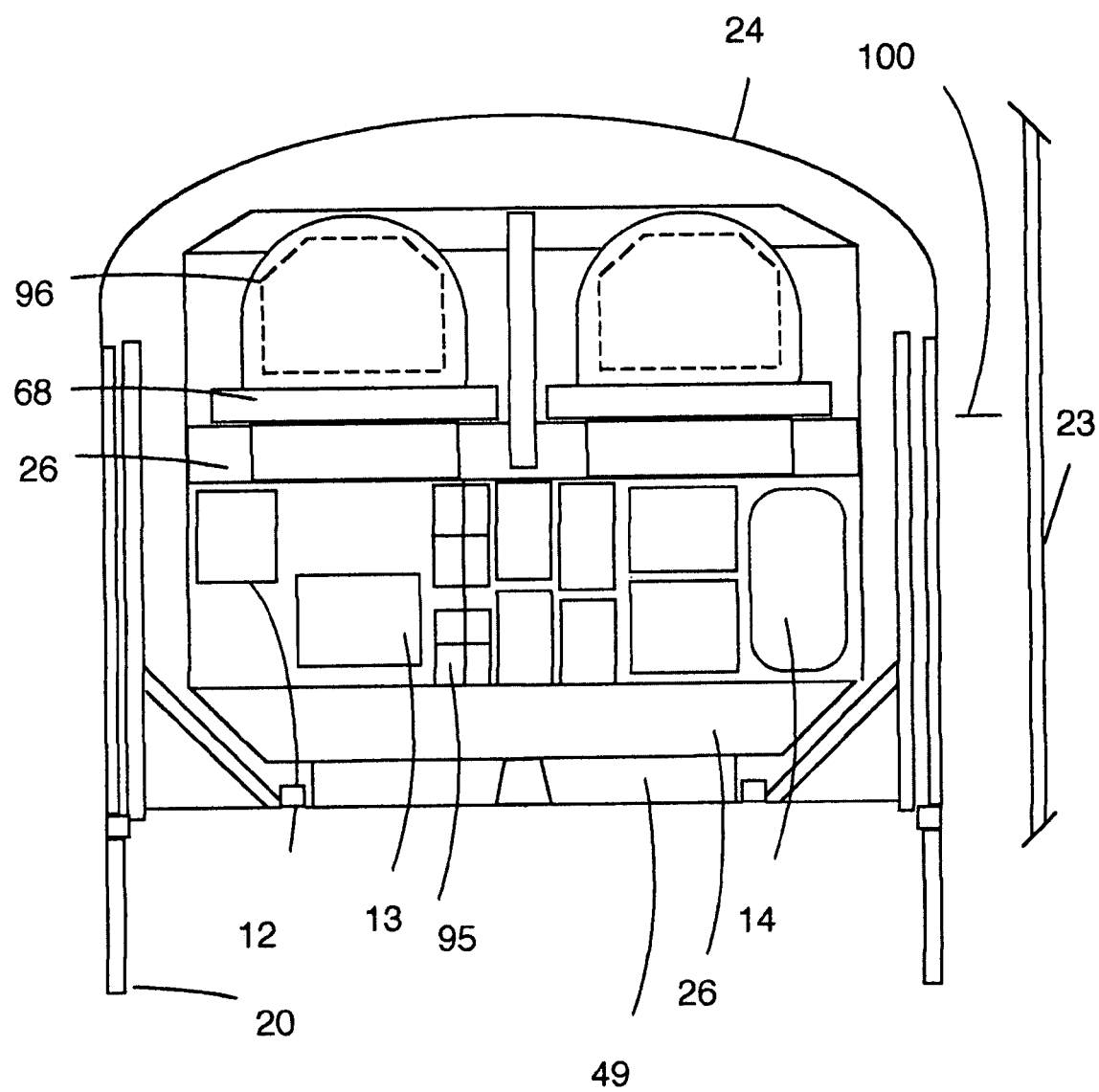
FIG. 9 shows an example payload carrier configuration of the orbital service platform of the present invention.

FIG. 9 shows a side view of smaller payload module 23 configuration for K-1 orbital vehicle (OV) 20 showing the outside payload container cylindrical walls and payload module dome 24. Payload module 23 is fabricated from two flat end caps 26 in a cylinder with payload module K-1 attachment remotely operated 49 on one end. Payload module K-1 attachment remotely operated 49 is used for both the K-1 connection and the connection to platform. Payload module 23 contains sounding rocket diameter payload envelope 14, mid-deck locker payload envelopes 12 in ring shapes patterns in both the side and upright position with last minute slip in small brick payload envelopes 95 in the center. Small brick payload envelopes 95, and small re-entry payload envelope 96 are contained in re-entry capsules 68 and spring jettisoned as commanded from the surface. Re-entry capsules 68 draw services from the platform such as power, communications and quality microgravity. Re-entry capsule 68 framework portion is discarded at separation plane remotely operated 100 or returned with a different mission. The reduced weight of the remaining two flat end caps 26 and the cylinder with mid-deck locker payload envelopes 12, expanded mid-deck lockers 13, brick shaped experiment envelopes 95 and other payload envelopes are sized and accommodate below separation plane remotely operated 100 to accommodate K-1 orbital vehicle (OV) 20 return cargo mass capability.

Figure 10:
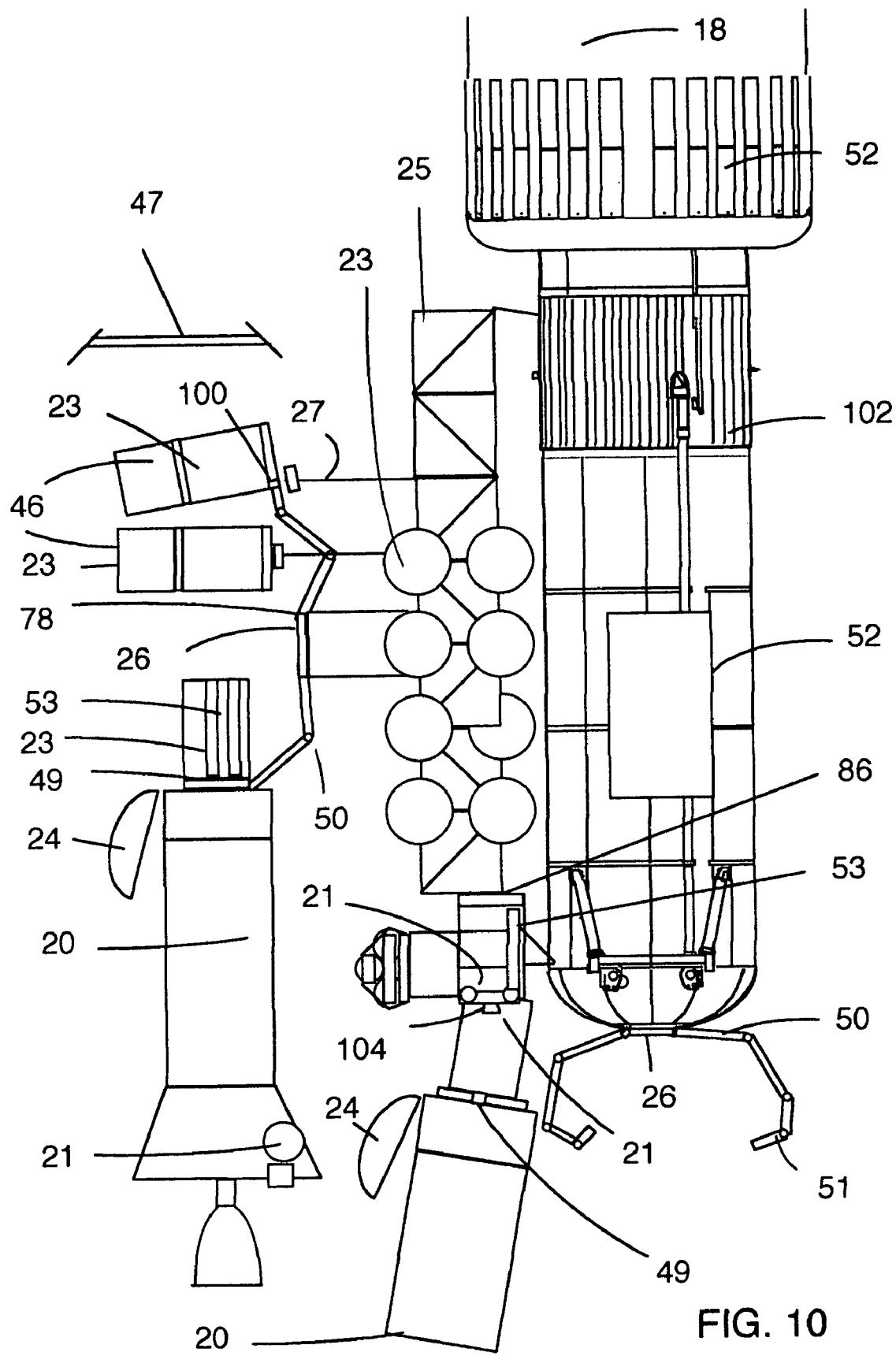
FIG. 10 shows an expanded configuration of the orbital service platform of the present invention on an external tank.

FIG. 10 shows an expanded configuration of the orbital service platform on an external tank. Salvaged external tank in orbit 102 is the subject of another patent and result of an Enabling Agreement with NASA, which includes a cash deposit. Salvaged external tank in orbit 102 is retained on a space transportation system (STS) mission and the external tank separation and jettison maneuver is delayed with NASA cooperation until orbit. (The salvage of the external tank is the subject of U.S. Pat. No. 5,813,632.) This space shuttle change in the mission profile saves some propulsion energy and provides an opportunity to salvage the external tank by placing a commercial package including propulsion package 104 and module support structure 25 on the external tank prior to separation from the space shuttle orbiter in orbit. The package provides attitude control and a reboost capability to the salvaged external tank prior to separation from the NASA orbiter. The salvage operation using a salvage package placed on the external tank by placing an orbiter payload from the shuttle orbiter payload bay on the external tank is the subject of U.S. Pat. No. 5,813,632 or a K-1 orbital vehicle transports the salvage package to orbit.

FIG. 10 shows an expanded configuration of the commercial service platform in space using salvaged external tank in orbit 102. The external tank is a propellant tank used by the space shuttle for 8.3 minutes on the ascent to orbit. This 154-foot long tank is then jettisoned into a re-entry trajectory and 80% burns up in the atmosphere re-entering above the Pacific Ocean. A new external tank is used each time and is taken to within 1 or 2 percent of full orbital velocity before being discarded. This means the cost for transporting the 58.000 pound external tank mass to orbit is already invested in the salvaged external tank in orbit 102.

Salvaged external tank in orbit 102 starts with a normal space shuttle launch with other customers using most of the shuttle payload weight and volume capability. The space shuttle retains salvaged external tank in orbit 102 as an attached space transportation system component, until the shuttle reaches orbit. The space shuttle with attached salvaged external tank in orbit 102 meets K-1 orbital vehicle (OV) 20 using its K-1 orbital maneuvering system propulsion 21 to accomplish a station keeping location below the shuttle orbiter near the aft end of to be salvaged external tank in orbit 102. One or more K-1 orbital vehicles deliver payloads of various types to the salvaged hardware in orbit and after one or more payloads are delivered and attached, sufficient orbital propulsion and control of the salvaged external tank in orbit 102 or other salvaged items is achieved to a level to permit the space shuttle to disconnect and proceed on other missions. (OV) 20 K-1 orbital vehicle (OV) 20 with payload module dome 24 opened and extended payload module 47 containing modified K-1 orbital maneuvering system (OMS) propulsion 21, large K-1 OMS propellant tanks, deployable module support structure 25, stowed solar panel 53, flexible connection cable 27, flat end cap 26 and payload module K-1 attachment remotely operated 49. Flat end cap 26 contains two robotic arms 50 with end effector 51 able to operate with commands from the surface. Flat end cap 26 contains stowed connection interface 80 with a liquid transfer capability permitting the transfer of liquids from future logistics propellant tanks into propulsion module 104.

K-1 orbital vehicle (OV) 20 and flat end cap 26 module with two robotic arms 50 moves within the visiting vehicle envelope of the orbital space shuttle with salvaged external tank 102 and maneuvers to a point near the aft end of salvaged external tank 102. The space shuttle uses its shuttle remote manipulator system (RMS) to monitor and control K-1 orbital vehicle (OV) 20. The space shuttle remote manipulator system (RMS) arm does not have the reach to remove flat end cap 26 module or salvage system package on the external tank near the aft end of the to be salvaged external tank 102. K-1 orbital vehicle (OV) 20 with flat end cap 26 module deploys two robotic arms 50 and grabs the solid rocket booster aft attachment points on salvaged external tank in orbit 102. Flat end cap 26 module contains platform subsystem package 86 and end effector 51. Flat end cap 26 module transfers platform subsystem package 86 using end effector 51 to aft end of the salvaged external tank 102. Platform subsystem package 86 is activated from the ground and takes control of salvaged external tank 102 including attitude control, communications and reboost as required. Then K-1 orbital vehicle (OV) 20 remains attached via the structural attachment of platform subsystem package 86 and the space shuttle performs a minimum explosive bolt separation from salvaged external tank 102. The minimum explosive bolt separation operation duplicates the normal launch plus T+488 second ET separation maneuver with some exceptions per NASA approval. The ET is structurally separated from the orbiter by means of pyrotechnic devices that fracture attachment links. The separation occurs in a manner that assumes no recontact between the orbiter and salvaged external tank in orbit 102. Much of the range safety system ordnance and tumbling subsystem have been removed, which makes the salvage more technically feasible. The external tank separation normally occurs approximately 488 seconds into the flight at an altitude of 59 nautical miles. In the space shuttle operations normally the 17 inch propellant lines are closed in the separation, but efforts to discard the propellant rather than contain it may be in the best interests of safety on early operations to salvage external tank in orbit 102.

K-1 orbital vehicle (OV) remains attached to salvaged external tank in orbit 102 and capable of maneuvering and reboosting salvaged external tank in orbit 102 to a higher orbit. The long axis of K-1 orbital vehicle (OV) 20 is aligned to pass through the center of gravity of salvage external tank in orbit 102. Salvaged external tank in orbit 102 is accomplished with a minimum of space shuttle participation and/or expense in hopes of accelerating the salvage operation into the shuttle operations participating in the assembly of the International Space Station (ISS).

K-1 orbital vehicle (OV) 20 and other logistics vehicles add later items to the commercial service platform including inflatable platform 18 components, solar panels 52, robotic arms 50, payload modules 23, flexible connection cables 27 to enhance the microgravity quality, product module 46, extended payload module 47 and module support structures 25. Propulsion module 104 is re-supplied with propellant by K-1 orbital vehicle (OV) 20 and other logistics vehicles. Circular disk with track 78 is placed near the center of gravity of the salvaged external tank 102 where the microgravity is the best and used to robotic arms 50 with end effectors s 51 are used to place payload modules 23 and additional module support structures 25 as required by the market. At some point the platform complex of development will become too large to deliver quality microgravity and other services at which time another distributed platform can be created.

Figure 11:
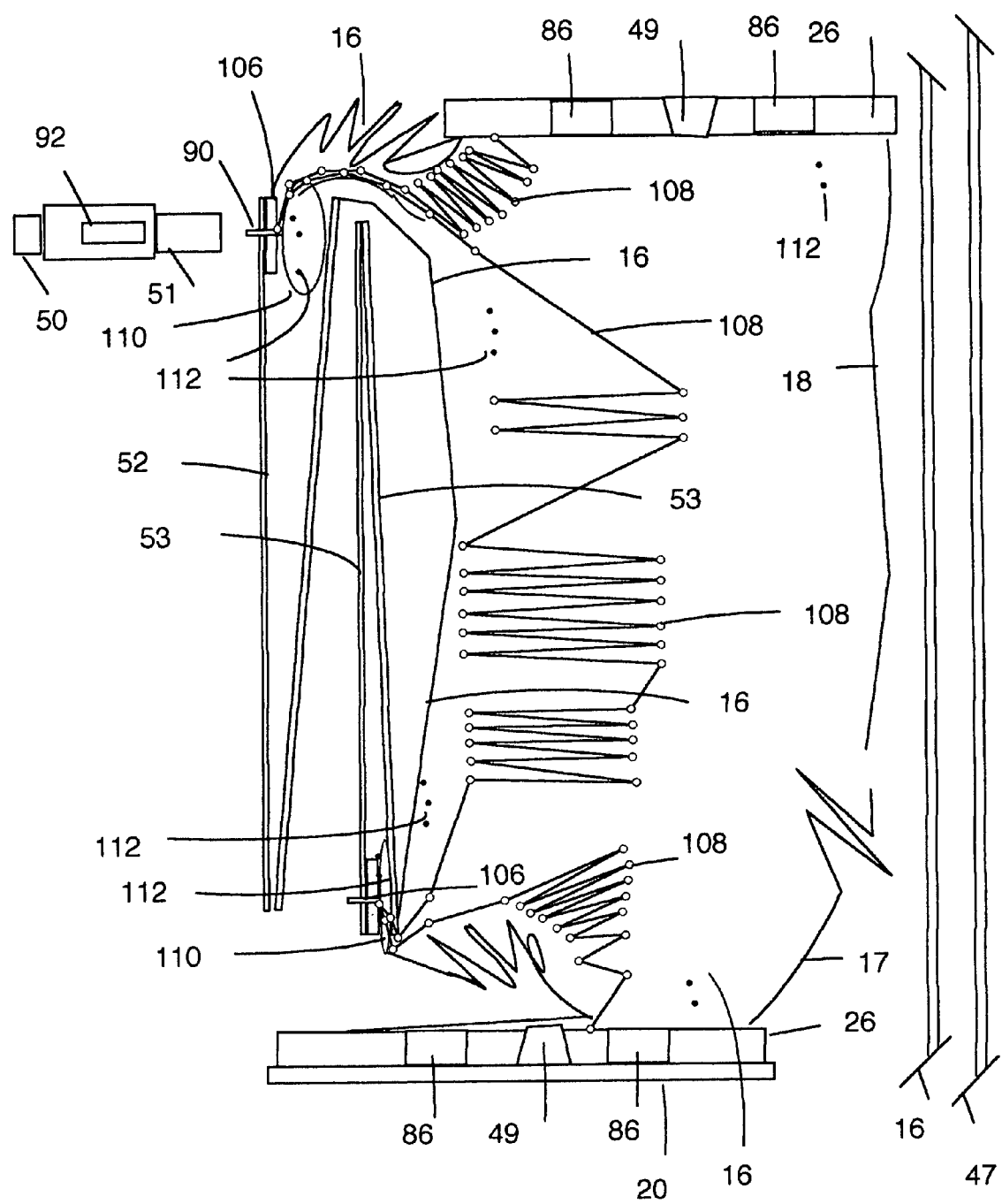
FIG. 11 shows a corner configuration of the inflatable orbital service platform of the present invention.

FIG. 11 shows a corner configuration of inflatable orbital service platform 18 shown in the inflating platform 17 configuration. Stowed solar panels 53 are the exterior of stowed inflatable platform 16 launch to orbit as extended payload module 47 on K-1 orbital vehicle (OV) 20. Solar panel 52 shown in stowed solar panel 53 configuration contains stowed inflatable platform 16 between two flat end caps 26. At least one flat end cap 26 has payload module K-1 attachment remotely operated 49 to permit remote release of stowed inflatable platform 16 in orbit. Solar cell panel connection with robot arm 106 using robotic arm 50 and end effector change out device 90 permit correct end effector 51 for the removal and replacement of stowed solar panels 53 using TV camera 92. Stowed solar panels 53 become solar panel 52 deployed and plugged into solar cell panel connection with robot arm 106. As stowed inflatable platform 16 becomes inflating platform 17 and later inflatable platform 18 torus ring inflatable volume 110 the inflation process by inflating first and rigidizing with foaming powder 112 activated by the inflation gas to become a rigid torus with structural foam inside. Other interior volumes similar to torus ring inflatable volume 110 are used to maintain inflatable platform 18 in useful shape. Internal wiring 108 is compressed inside stowed inflatable platform 16 and decompresses as inflating platform 17 is inflated to become useful in connecting stowed solar panels 53 to platform subsystem package 86 in final inflatable platform 18.

Although the invention has been described in detail with particular reference to these preferred embodiments, other embodiments can achieve the same results. Variations and modifications of the present invention will be obvious to those skilled in the art and it is intended to cover all such modifications and equivalents.

What is claimed is:

1. A space platform comprising:
    a first module transportable to outer space in a compressed form and expandable in outer space, said first module comprising end caps disposed at terminal portions thereof, at least one of said end caps comprising one or more tracks circumferentially disposed therein or thereon, and said module expanding along an axis defined by said end caps during inflation;
    one or more carriers disposed on said one or more tracks; and
    one or more inflatable robotic arm devices disposed within each of said end caps and attached to one of said carriers.

2. The space platform of claim 1 further comprising:
    a second module transportable to outer space in a compressed form and expandable in outer space said second module comprising end caps disposed at terminal portions thereof, at least one of said end caps comprising one or more tracks circumferentially disposed therein or thereon, and said second module expanding along an axis defined by said end caps during expansion; and
    one or more carriers disposed on said one or more tracks; and one or more inflatable robotic arm devices disposed within each of said end caps and attached to one of said carriers.

3. The space platform of claim 2 wherein said first and said second modules are connectable at said end caps.

4. The space platform of claim 3 wherein one of said end caps on said first module rotates with an end cap on said second module from force provided by one or more of said robotic arm devices.

5. The space platform of claim 4 wherein each of said one or more carriers is movable about its corresponding track.

6. The space platform of claim 1 further comprising extendable and retractable connection hardware.

7. The space platform of claim 6 wherein said connection hardware comprises adjustable and rotatable connection hardware.

8. The space platform of claim 3 wherein said end caps are capable of transferring connectable box items between said end caps.

9. The space platform of claim 1 wherein said robotic arm devices are capable of switching out, stowing and loading additional modules.

10. The space platform of claim 1 wherein each of said end caps comprises a disc-shape.

11. The space platform of claim 1 further comprising communications electronics.

12. The space platform of claim 1 further comprising transportation electronics.

13. The space platform of claim 1 wherein said robotic arm devices comprise at least one elbow.

14. The space platform of claim 1 wherein said robotic arm devices comprise an end effector.

15. The space platform of claim 1 wherein said first module expands to a length sufficient to establish gravity gradient stability for said platform.

16. The space platform of claim 1 further comprising a support structure disposed between said end caps.

17. The apparatus of claim 14 wherein said support structure comprises a truss system.

18. An orbital unmanned platform combined with a reusable launch vehicle comprising:
   an unmanned payload transported to space, said payload comprising an expandable structure comprising end caps disposed at terminal portions thereof, said structure expanding along an axis defined by said end caps during expansion, at least one of said end caps comprising, one or more tracks circumferentially disposed within or around said end cap, one or more carriers disposed on said one or more tracks; and one or more inflatable arm sections disposed within said end caps and attached to one of said carriers; and
   a different payload transported upon return from space;
   whereby said combination creates a complete transportation cycle and a functioning node in space.

19. The orbital unmanned platform combined with a reusable launch vehicle of claim 18 further comprising at least part of the payload remaining in space and at least part of the payload returning from space.

20. The orbital unmanned platform combined with a reusable launch vehicle of claim 19 wherein said payloads are accumulated, assembled, tested and transferred at a node platform.

21. The space platform of claim 1 wherein said first module comprises an inflatable module.

22. The space platform of claim 2 wherein said second module comprises an inflatable module.

23. The orbital unmanned platform of claim 18 wherein said expandable structure comprises an inflatable structure.

* * * * *